US010411812B1

(12) United States Patent
Rose

(10) Patent No.: US 10,411,812 B1
(45) Date of Patent: Sep. 10, 2019

(54) OPTICAL INTERCONNECT COMPUTING MODULE TOLERANT TO CHANGES IN POSITION AND ORIENTATION

(71) Applicant: Forrest I Rose, Encinitas, CA (US)

(72) Inventor: Forrest I Rose, Encinitas, CA (US)

(73) Assignee: Forrest Rose, Encinitas, CA (US)

( * ) Notice: Subject to any disclaimer, the term of this patent is extended or adjusted under 35 U.S.C. 154(b) by 0 days.

(21) Appl. No.: 14/214,271

(22) Filed: Mar. 14, 2014

Related U.S. Application Data

(60) Provisional application No. 61/789,461, filed on Mar. 15, 2013.

(51) Int. Cl.
*H04B 10/80* (2013.01)
*H04B 10/114* (2013.01)
(Continued)

(52) U.S. Cl.
CPC ....... *H04B 10/803* (2013.01); *H04B 10/1141* (2013.01); *H04B 10/564* (2013.01);
(Continued)

(58) Field of Classification Search
CPC ............... H04B 10/803; H04B 10/1141; H04B 10/564; H04B 10/672; H04B 10/11; H04B 10/1125; H04B 10/118; H04B 10/808; H04B 10/10; H04B 10/00; H04B 10/801; H04B 10/80; H04B 10/1123; H04B 10/1127; H04B 10/1143; H04J 14/00; H04J 14/02; G02F 1/0541; G02F 1/293; G02F 1/0126; G02F 1/0338; G02F 2203/026; G03H 1/0005; G02B 6/2804; G02B 6/43;
(Continued)

(56) References Cited

U.S. PATENT DOCUMENTS

| 485,044 | A | | 10/1892 | Kinipple | |
|---|---|---|---|---|---|
| 3,805,061 | A | * | 4/1974 | De Missimy | ........... F16P 3/144 250/208.3 |

(Continued)

FOREIGN PATENT DOCUMENTS

| EP | 0513993 A2 | 11/1992 |
|---|---|---|
| EP | 0339657 B1 | 9/1993 |
| EP | 0322218 B1 | 9/1994 |
| EP | 1160614 A2 | 12/2001 |
| EP | 1291693 A1 | 3/2003 |

*Primary Examiner* — Abbas H Alagheband

(57) ABSTRACT

An optical interconnect computing module having free space optical interconnects that form communication links with other systems with like optical interconnects and with computer blades contained within the computing module. The computing module adapts to changes in the position and orientation and other factors of the optical interconnects. The optical interconnects utilize solid-state electronic and optoelectronic components and optical components. The ability to adapt is controlled by an algorithm implemented in software, firmware and logic circuits. Computing modules within an equipment rack and between equipment racks as well as blades contained within a computing module may experience changes in position and orientation due to installation misalignment, servicing of equipment, vibrations, floor sagging, thermal expansion and contraction, earthquakes, line-of-sight obstructions, manufacturing imperfections and other sources.

30 Claims, 28 Drawing Sheets

(51) Int. Cl.
*H04B 10/564* (2013.01)
*H04B 10/67* (2013.01)
*H04B 10/112* (2013.01)
*G02B 6/35* (2006.01)
*G02B 6/36* (2006.01)
*G01V 8/20* (2006.01)

(52) U.S. Cl.
CPC ............ *H04B 10/672* (2013.01); *G01V 8/20* (2013.01); *G02B 6/3502* (2013.01); *G02B 6/3512* (2013.01); *G02B 6/3644* (2013.01); *H04B 10/1123* (2013.01); *H04B 10/1127* (2013.01); *H04B 10/1143* (2013.01)

(58) Field of Classification Search
CPC .. G02B 6/3512; G02B 6/3502; G02B 6/3644; G01V 8/10; G01V 8/20
USPC ......... 398/131, 129, 130, 96, 103, 118, 124, 398/128, 122, 201, 73, 158, 126, 54; 361/783
See application file for complete search history.

(56) References Cited

U.S. PATENT DOCUMENTS

| | | | |
|---|---|---|---|
| 4,808,808 A * | 2/1989 | Karasaki | G02B 7/343 250/201.2 |
| 4,838,630 A * | 6/1989 | Jannson | G02B 6/43 359/15 |
| 4,877,297 A * | 10/1989 | Yeh | G02F 1/0541 359/11 |
| 5,095,200 A * | 3/1992 | Matsuda | G06E 3/006 250/214 LS |
| 5,311,345 A * | 5/1994 | Cloonan | H04L 49/45 370/417 |
| 5,358,341 A * | 10/1994 | Blaettner | H02K 1/17 310/90 |
| 5,392,157 A * | 2/1995 | Shih | G02B 26/0808 359/196.1 |
| 5,412,506 A * | 5/1995 | Feldblum | G02B 5/1876 359/566 |
| 5,432,722 A * | 7/1995 | Guilfoyle | G02F 3/00 359/107 |
| 5,465,379 A * | 11/1995 | Li | G02B 6/43 385/15 |
| 5,500,523 A * | 3/1996 | Hamanaka | G02B 3/0006 250/216 |
| 5,680,490 A * | 10/1997 | Cohen | H04J 14/02 385/24 |
| 5,706,114 A * | 1/1998 | Erteza | H04B 10/11 359/15 |
| 5,726,786 A * | 3/1998 | Heflinger | H04B 10/1149 398/121 |
| 5,771,320 A * | 6/1998 | Stone | G02B 6/2861 385/16 |
| RE35,855 E * | 7/1998 | Blaettner | H02K 1/17 310/90 |
| 5,781,671 A * | 7/1998 | Li | H04B 10/803 372/50.1 |
| 5,857,042 A * | 1/1999 | Robertson | G02B 6/4249 359/455 |
| 5,986,788 A * | 11/1999 | Sasaki | G02B 6/4206 359/718 |
| 6,122,084 A * | 9/2000 | Britz | H04B 10/0775 385/140 |
| 6,285,481 B1 * | 9/2001 | Palmer | H04B 10/118 398/119 |
| 6,323,980 B1 * | 11/2001 | Bloom | H04B 10/1125 398/116 |
| 6,452,705 B1 * | 9/2002 | Paxton | G02B 6/43 257/82 |
| 6,504,634 B1 * | 1/2003 | Chan | H04B 10/1125 398/129 |
| 6,509,992 B1 * | 1/2003 | Goodwill | H04B 10/1141 398/129 |
| 6,516,103 B1 * | 2/2003 | Palese | G02F 1/0126 385/5 |
| 6,526,211 B2 * | 2/2003 | Rumer | G02B 6/43 385/134 |
| 6,735,438 B1 * | 5/2004 | Sabatino | H01Q 1/246 343/705 |
| 6,775,480 B1 * | 8/2004 | Goodwill | H04B 10/11 398/119 |
| 7,035,549 B2 * | 4/2006 | Davies | G02B 6/43 398/129 |
| 7,039,265 B2 * | 5/2006 | Levy | H04B 10/801 385/14 |
| 7,110,679 B2 * | 9/2006 | Byers | G02B 6/2804 398/164 |
| 7,181,518 B1 * | 2/2007 | Matsumoto | H04L 51/34 709/203 |
| 7,412,123 B1 * | 8/2008 | Mader | G02B 6/43 385/129 |
| 7,414,717 B2 * | 8/2008 | Kamerman | G01J 3/0208 356/301 |
| 7,805,080 B2 * | 9/2010 | Wang | H04B 10/803 398/122 |
| 7,961,313 B2 * | 6/2011 | Van Neste | G01N 21/1702 356/311 |
| 7,978,981 B2 * | 7/2011 | Buckman | H04B 10/801 398/118 |
| 8,103,167 B2 * | 1/2012 | Tidhar | H04B 10/1143 398/130 |
| 8,428,469 B2 * | 4/2013 | Kim | H04W 72/048 398/127 |
| 9,264,136 B2 * | 2/2016 | Vaananen | H04B 10/1123 |
| 9,628,190 B2 * | 4/2017 | Urino | H04B 10/516 |
| 2002/0006247 A1 * | 1/2002 | Vaganov | G02B 1/06 385/17 |
| 2002/0105699 A1 * | 8/2002 | Miracky | G02B 6/1245 398/56 |
| 2002/0131121 A1 * | 9/2002 | Jeganathan | H04B 10/1127 398/128 |
| 2003/0035180 A1 * | 2/2003 | Byers | G02B 6/2804 398/164 |
| 2003/0035182 A1 * | 2/2003 | Sidorovich | H04B 10/1149 398/126 |
| 2003/0068133 A1 * | 4/2003 | Tatah | G02B 6/29317 385/43 |
| 2004/0042737 A1 * | 3/2004 | Devine | H01S 5/423 385/89 |
| 2005/0133702 A1 * | 6/2005 | Meyer | G01V 8/20 250/221 |
| 2006/0024061 A1 * | 2/2006 | Wirth | H04B 10/1125 398/129 |
| 2006/0216042 A1 * | 9/2006 | Yeo | H03G 3/3084 398/209 |
| 2006/0251421 A1 * | 11/2006 | Arnon | H04B 7/10 398/73 |
| 2007/0297808 A1 * | 12/2007 | Pavelchek | H04B 10/1123 398/158 |
| 2008/0173831 A1 * | 7/2008 | Wuestefeld | G01V 8/20 250/551 |
| 2009/0174867 A1 * | 7/2009 | Malfait | G02B 27/0933 353/69 |
| 2010/0296820 A1 * | 11/2010 | Kuo | G02B 26/0875 398/201 |
| 2011/0204211 A1 * | 8/2011 | Klingelhofer | G01V 8/20 250/208.2 |
| 2013/0251375 A1 * | 9/2013 | Ozaki | H04B 10/116 398/130 |
| 2015/0037042 A1 * | 2/2015 | Gurovich | H04B 10/60 398/118 |

* cited by examiner

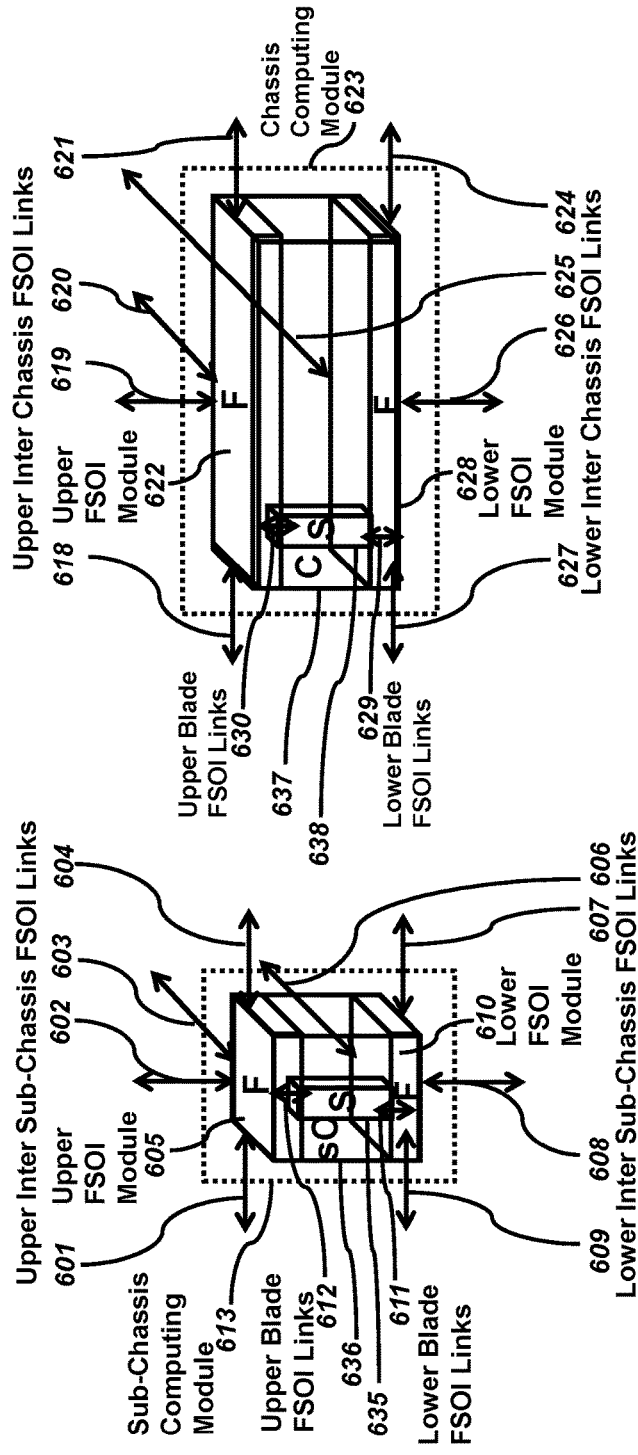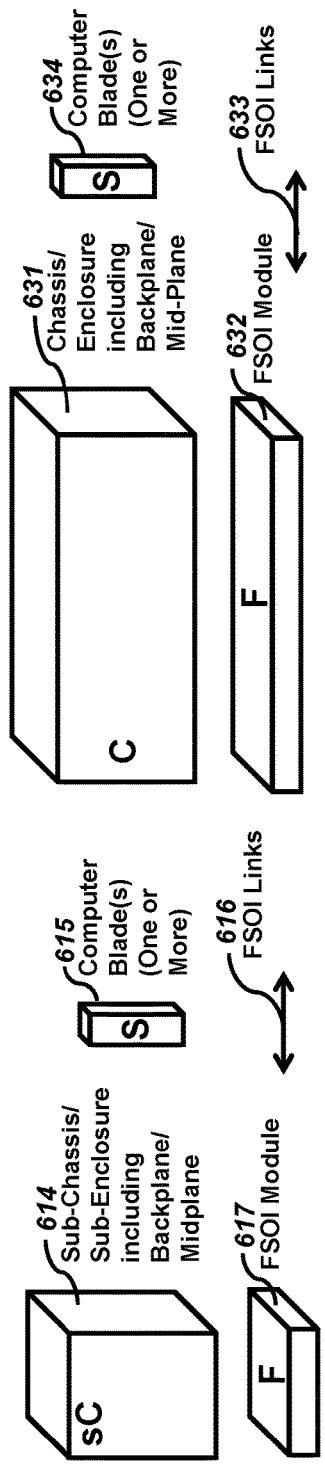
FIG. 6B
FIG. 6A

Construction of a Chassis Computing Module Consisting of Two Side-By-Side Sub-Chassis Computing Modules

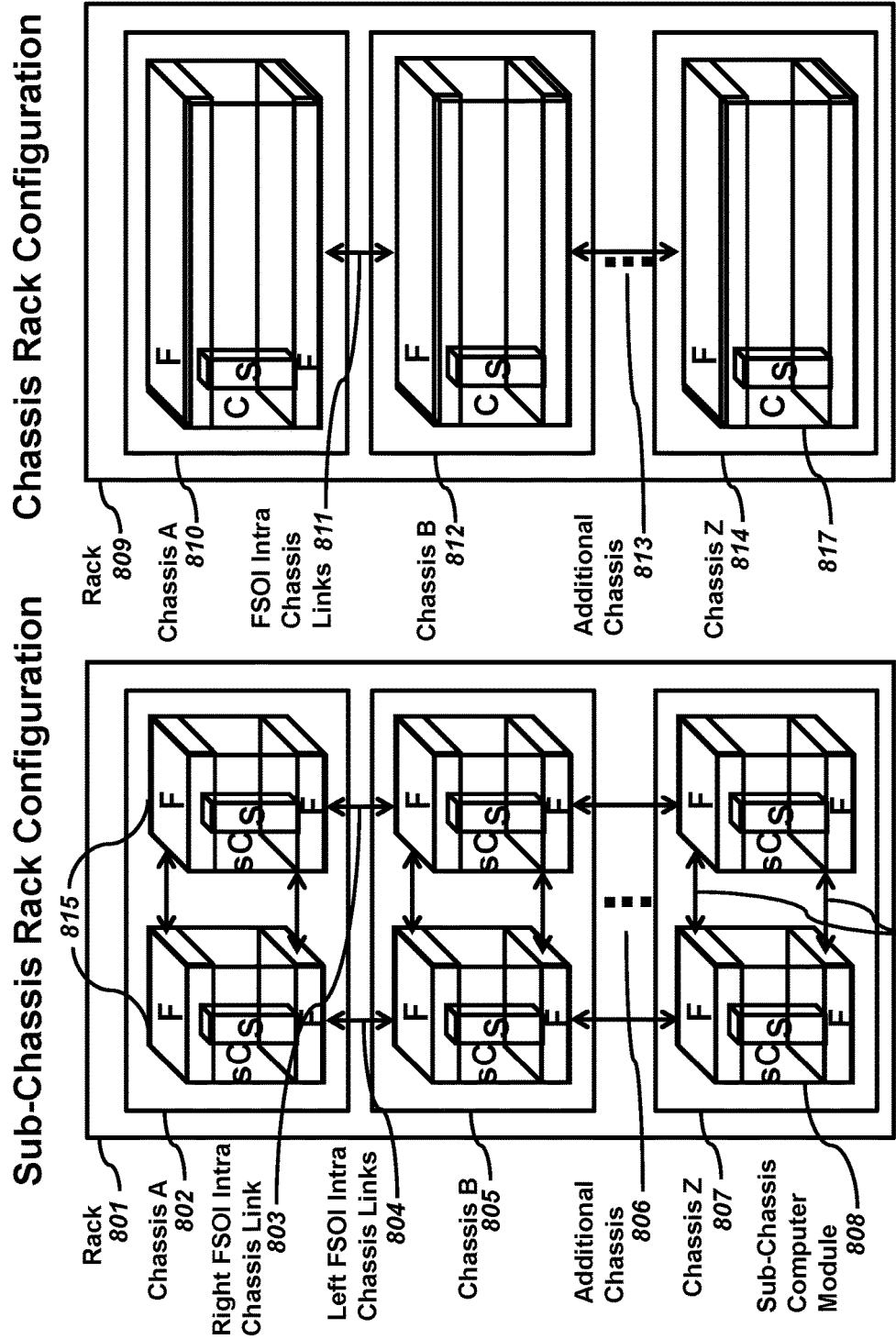

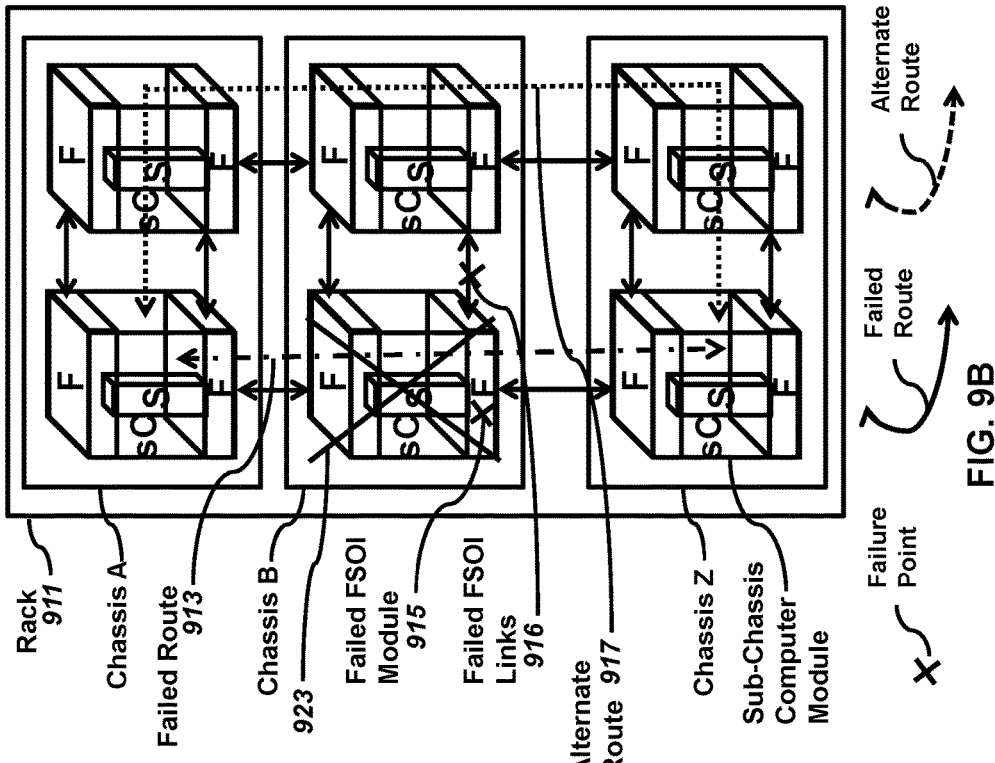
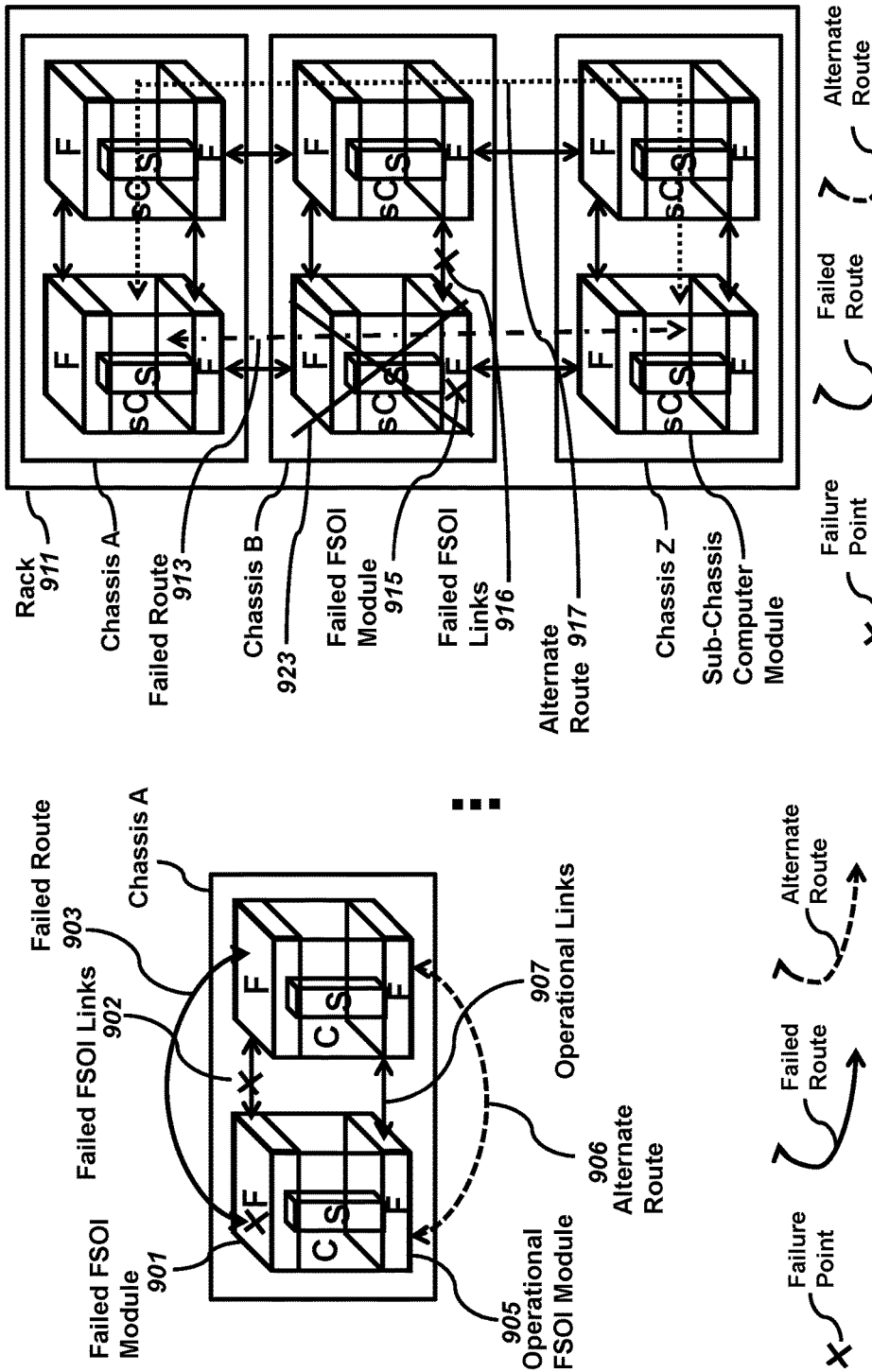
FIG. 9B
FIG. 9A

OPTICAL INTERCONNECT COMPUTING MODULE TOLERANT TO CHANGES IN POSITION AND ORIENTATION

CROSS-REFERENCE TO RELATED PATENT APPLICATIONS

This application claims benefit under 35 U.S.C. § 119(e) of Provisional Application No. 61/789,461 filed Mar. 15, 2013.

FIELD OF THE INVENTION

The invention relates generally to optical communication systems and more particularly to an improved structure and apparatus for a low-cost and high-performance computing module having optical interconnects to other like computing modules and to computer blades contained within the computing module.

BACKGROUND OF THE INVENTION

Free-space optical interconnects (FSOIs) have been proposed as a means of data transfer between system modules. Examples of system modules are chips, circuit boards, computing modules and equipment enclosures containing the aforementioned. Techniques commonly used are passive and active mechanical alignment mechanisms. Many systems contain serviceable modules that may be installed and removed from the system which add to the complexity and cost of mechanical alignment for FSOIs. Often, these systems employ backplanes or mid-planes. Backplanes are often characterized as having slots on one side of the printed circuit board to accept connections, whereas mid-planes are often characterized as having slots on both sides of the printed circuit board.

Without alignment, light power detected at the receiver may be reduced and/or optical crosstalk may increase which results in the degradation of the data carrying capacity of the FSOIs. Misalignment is characterized as the displacement from the nominal alignment. Displacements can be horizontal, vertical, longitudinal, angular or any combination of the aforementioned. The sources and range of misalignment are numerous and varied. Misalignments range from thermal expansion/contraction effects to equipment shifting due to earthquakes. Other sources include manufacturing imperfections, vibrations, installation misalignment and floor sagging to name a few. The challenges of establishing and maintaining alignment are further compounded as the number of optical interconnects is increased.

Many alignment techniques are used to compensate a limited range of misalignment. These include precise manufacturing tolerances, design geometry, out-of-band misalignment monitoring, adjustment and rerouting data channels to redundant elements.

Optical beam divergence of a transmit light emitting device and diffraction effects along a path severely limit the distances in which a receive photo-detector can detect sufficient light so that data can be reliably extracted. Beam divergence and diffraction affect the distance over which reliable communication data can flow. In addition, beam divergence, diffraction and other sources can cause undesirable crosstalk in FSOIs with multiple interconnects that are spaced close to one another. Further degradation can occur by stray light which may find its way to the receive photo-detectors.

FSOIs may lose some or all of the ability to transfer data when line-of-sight obstructions are present. Obstructions include, but are not limited to cables, dust and personnel interference. This is exacerbated when multiple FSOIs are closely packed with one another. The ability to transfer data is also affected by component degradation and failures including, but not limited to loss of transmit light emitter luminosity and loss of receive photo-detector sensitivity.

Therefore, there is a need for development of FSOIs tolerant to a range of displacements from the nominal alignment without the need for mechanical alignment mechanisms, achieve data communication over longer line-of-sight distances, achieve partial obstruction immunity, increased isolation from crosstalk and stray light, increased tolerance to component failures and degradation, the methods of operation thereof which would provide resilient and reliable data transfer.

A blade server and data processing module are examples of a computer module. The rearward end of the modules often includes connectors that mate with backplane connectors within the enclosure or chassis when the removable modules are inserted into the enclosure or chassis. Data communication between modules is often through passive backplane or mid-plane connections. The connections may be metal-based, optical-based or a combination of either of the aforementioned. The connections may be point-to-point or shared which bounds the data carrying capacity of the backplane or mid-plane to the size of the backplane or mid-plane and the number of connections provided by the connectors on the backplane or mid-plane. An increased requirement in the number of modules or data transfer between modules necessitates a larger backplane or mid-plane to accommodate a larger number of connections which has practical limits.

Therefore, there is a further need for development of an expandable backplane or mid-plane system that is not bounded by the practical limits of a single backplane or mid-plane such that as the number of modules increases, there is a corresponding increase in the number of connections between modules contained in the system and a corresponding increase in the data carrying capacity of the system.

SUMMARY OF THE INVENTION

In accordance with the present invention, there is provided an optical interconnect computing module having free space optical interconnects (FSOIs) that form communication links with other computing modules and with computer blades contained within the computing module and method which seeks to provide a solution that overcomes the above mentioned limitations.

An embodiment of the present invention adjusts the assignment of transmit elements of an array to the receive elements of an array. In this way, misalignments can be accommodated without mechanical alignment techniques or use of redundant elements.

A transmit element comprises of a refractive compensation lens and a light emitting device such as, but not limited to vertical-cavity surface emitting lasers, light emitting diodes and edge emitting laser diodes. The light energy distribution of a transmit element is the transmit element power window. A receive element comprises of conditioning optics and a photo-detector device such as, but not limited to photo-diodes, phototransistors, photoconductors and photomultipliers. The light energy received, accepted and detectable by a receive element is the receive element power acceptance window. In a preferred embodiment, a receive element comprises a photo-detector, refractive adaptation stage and a prism. The prism receives and directs light from multiple light sources to the refractive adaptation stage via an exit window. Light rays that do not exceed a maximum angle or lateral displacement relative to the entrance window are passed through the exit window. Light rays that exceed a maximum angle or lateral displacement relative to the entrance window are reflected or refracted away from the exit window.

Transmit and receive elements may be arranged in one or two dimensional arrays that conform to a plane or curved surface or a combination of planes and curved surfaces. In one embodiment, FSOIs consist of a two dimensional transmit element and receive element array. One or more transmit elements and a single receive element whose light power windows are sufficiently aligned to a path to form a unidirectional free space optical interconnect (FSOI) link. Thus, with an array, there may be one or more unidirectional FSOI links.

In a preferred embodiment, changes in position and orientation of the FSOIs may cause a change in the number of pathways, the number of FSOI links, and/or the number of transmit elements assigned to a receive element. Changes in position and orientation may cause an increase in distance between transmit and receive elements and may result in an increase in the number of transmit elements assigned to a receive element. An increase of transmit elements has the advantage of compensating for any loss of transmit light power received at a receive element to maintain a reliable communications link. Changes in position and orientation may cause a decrease in distance between transmit and receive elements and may result in an increase in the number of pathways.

In a preferred embodiment, two or more transmit elements are assigned to a receive element. A change in position and orientation may cause one or more transmit elements to become unassigned to the receive element and one or more transmit elements previously unassigned may become assigned to the receive element. If during the transition there is at least one transmit element assigned at all times and there is sufficient light power received at the receive element, then data transfer continues over the FSOI link uninterrupted. Thus, with sufficient transmit elements and light power received at a receive element, changes in position and orientation do not disrupt data transfer.

In one embodiment, a two-dimensional array of receive and transmit elements consist of transmit and receive elements with fiber optic cables or strands to form a compact array. In this way, only the fiber optic cables or strands present a line-of-sight path to the corresponding array over free-space.

A selection process manages the FSOI transmit and receive arrays, the assignment between transmit and receive elements that resides on a controller module whose function is in part to create and maintain the FSOIs and the FSOI links. Instead of using out-of-band techniques, the selection process passes messages in-band on the FSOI links. For each uni-directional link comprising a transmit and receive array pair, the selection process creates an FSOI by illuminating and extinguishing transmit elements. Transmit elements that are found to contribute most significantly to the light energy power detected at a photo-detector of a receive element are assigned to the receive element. Transmit elements that contribute significantly to the light energy power detected at photo-detectors of multiple receive elements are extinguished and are not assigned to any receive elements. The selection process runs continuously and revises transmit and receive element link associations as relative position or orientation changes that may occur over time. Relative position and orientation changes over time may increase, decrease or maintain the same number of transmit elements associated with a receive element. This includes, but is not limited to an increase in the number of transmit elements as relative longitudinal separation between transmit and receive elements increase. The selection process indirectly detects other non-positional and non-orientation changes such as but not limited to degradation of components, dust accumulation and personnel obstruction.

The selection process stores state information about link error rates, the previous and current associations between transmit and receive elements for paths, extinguished transmit elements, the relative position and orientation of transmit and receive arrays. It also stores physical, electrical, and light properties of the arrays and components that make up the arrays. Illumination templates are stored for used to provide full or partial communication over a defined range of relative positions and orientations.

When the links are sufficiently reliable as determined by error rate thresholds, the selection process uses a predefined data link layer message set and procedures for message and information exchange. The message set and procedures include, but are not limited to transfer of state, control and statistics information over the links. When the links are not sufficiently reliable as determined by error rate thresholds, the selection process uses a rudimentary predefined message set comprising pre-defined patterns of illumination and extinguishment sequencing of transmit elements in pre-defined patterns.

In one embodiment, a FSOI module comprises of a printed circuit board and housing containing FSOIs and data packet switching logic to communicate with a plurality of computer blades within the same enclosure or chassis and between other FSOI modules in other enclosures or chassis located within line-of-sight laterally, above and below, and behind. The FSOI module contains connectors for insertion into a backplane or mid-plane. In addition to conventional bus signals, it receives electrical power from the backplane or mid-plane. Also contained is an FSOI controller and networking module that operates the selection process for adapting the FSOI arrays to paths. In addition, the FSOI controller and networking module manages the FSOI links and networking protocols.

Computer blades may contain FSOIs. In one embodiment, computer blades contain FSOIs along the top and/or bottom of the printed circuit board edge. In addition, the printed circuit board contains connectors for backplane or mid-plane insertion and removal. Status LEDs and ports for blade management appear on the front of the printed circuit board. In one embodiment, transmit and receive arrays are placed on opposite sides of the printed circuit board for any one edge. In another embodiment, transmit and receive arrays are placed on the same side of the printed circuit board for any one edge. The FSOI links are managed by the FSOI and networking controller module.

In one embodiment, a computing module is comprised of two FSOI modules, a plurality of computer blades, a backplane or mid-plane, power supply, management and networking modules and cooling fans. The FSOI modules are located opposite from one another at the top and bottom of the enclosure and connected to the front side of the backplane or mid-plane. Computer blades are connected to the front of the backplane or mid-plane. Network, power supply, and management modules are connected on the backside of the mid-plane. FSOI modules and computer blades can be removed and inserted for equipment upgrades and maintenance. Since the FSOIs are between computer blades and the FSOI module, removal and insertion of a computer blade does not necessarily disrupt operations of other computer blades contained in the computing module. Likewise, removal and insertion of an FSOI module does not necessarily disrupt operations of the computer blades contained within the computing module. Data transfer can be rerouted through the second installed FSOI module.

In a preferred embodiment, a single rack configuration comprises of two computing modules per row. The two computing modules per row facilitate the rerouting of data around failed modules within the rack. In another embodiment, a multiple rack configuration comprises of one computing module per row within the rack. The row of computing modules between the racks facilitates the rerouting of data around failed modules. In another embodiment, a multiple rack row configuration facilitates the rerouting of data around failed computing modules or racks. In another preferred embodiment, a geometrical construction forms an FSOI k-ary n-tree mesh between two opposing rows of racks consisting of computing modules.

BRIEF DESCRIPTION OF DRAWINGS

FIGS. 6A and 6B illustrate the construction of a computing module consisting of FSOI links, computer blades, FSOI modules, sub-chassis, sub-enclosures, chassis, and enclosures.

FIG. 8A illustrates the sub-chassis rack configuration and FSOI links between computing modules.

FIG. 8B illustrates the chassis rack configuration and FSOI links between computing modules.

FIG. 9A illustrates the rerouting of communication data over alternate FSOI links between computing modules contained within a chassis for failed FSOI links.

FIG. 9B illustrates the rerouting of communication data over alternate FSOI links between computing modules contained within a rack for failed FSOI links or failed computing module.

DETAILED DESCRIPTION

Figure 18:
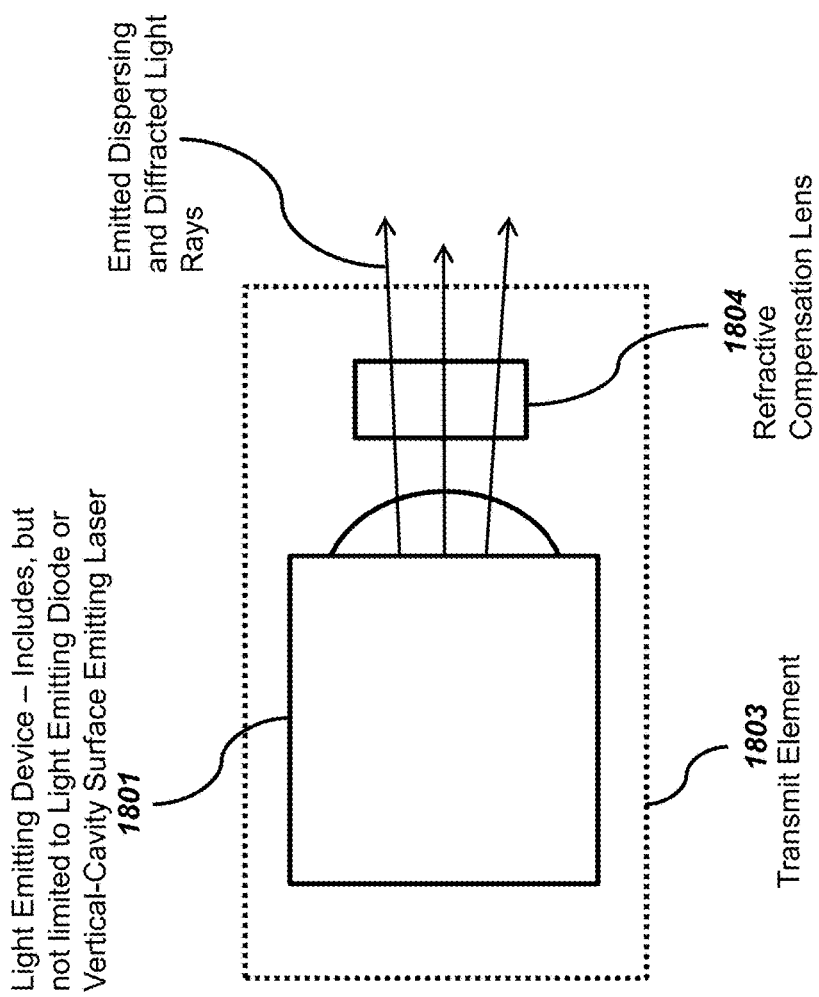
FIG. 18 illustrates a transmit element consisting of a light emitting device and a refractive compensation lens.

FIG. 18 shows a transmit element 1803 consisting of a refractive compensation lens 1804 stage and a light emitting device 1801 such as, but not limited to vertical-cavity surface emitting lasers, light emitting diodes and edge emitting laser diodes.

Figure 19:
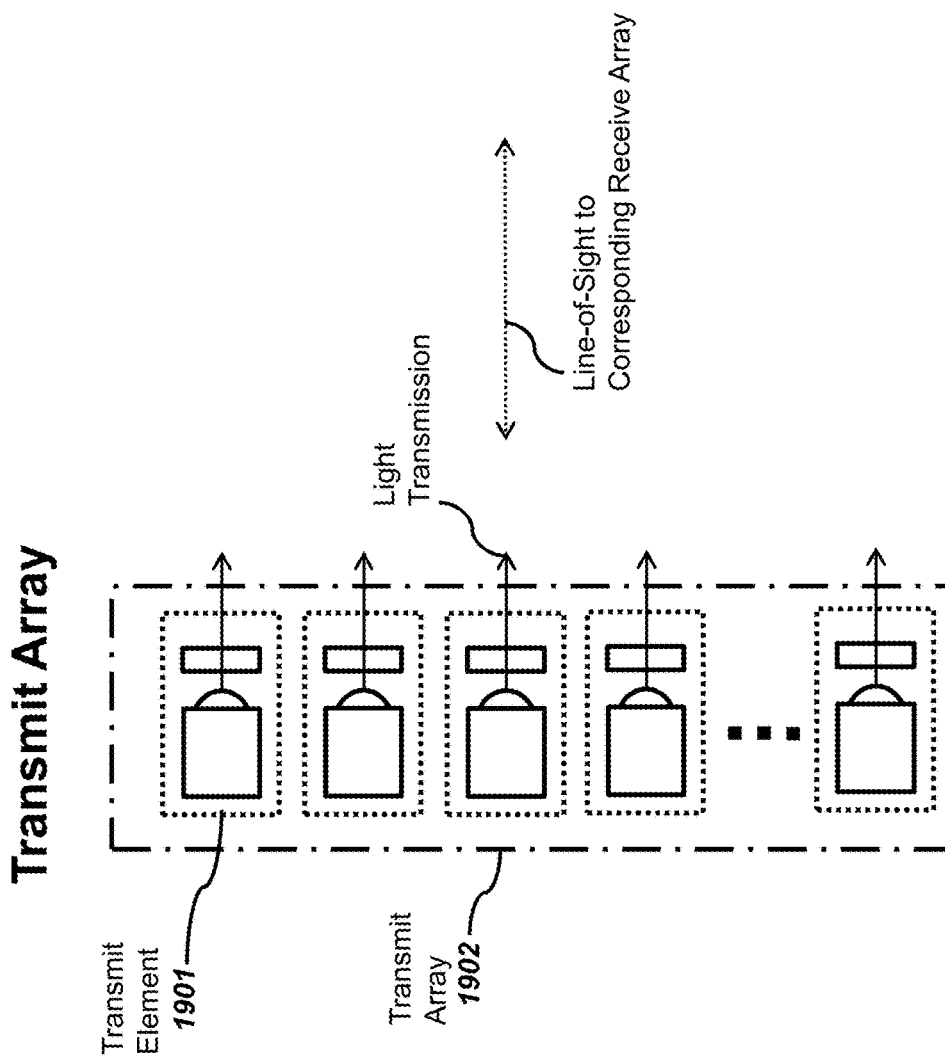
FIG. 19 illustrates a transmit array consisting of transmit elements of FIG. 18.

FIG. 19 shows one embodiment of a transmit array 1902 consisting of a plurality of transmit elements 1901 as shown in FIG. 18. The transmit elements are arranged in a one or two-dimensional array 1902 and conform to a plane or curved surface or a combination of planes and curved surfaces.

Figure 20:
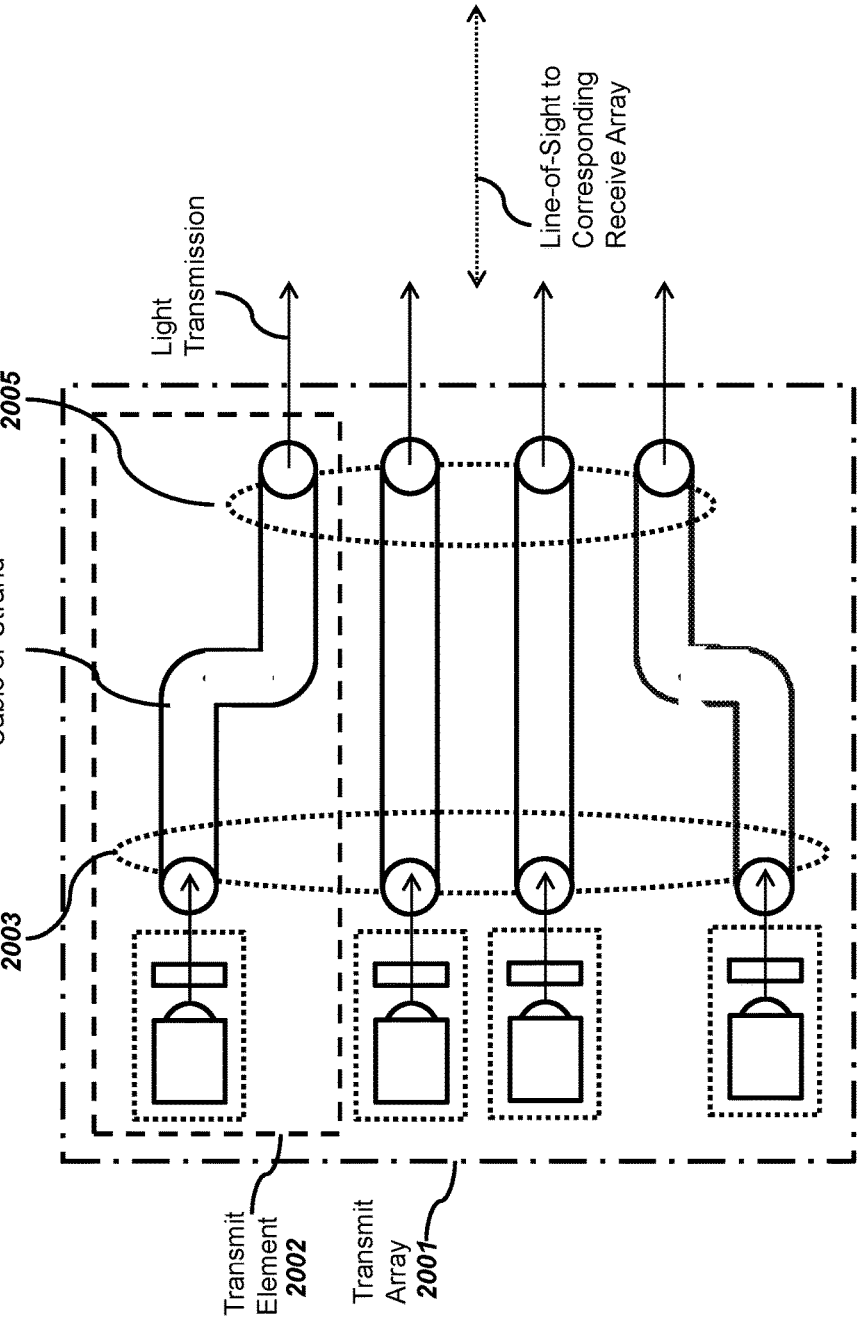
FIG. 20 illustrates a transmit array consisting of transmit elements of FIG. 18 and fiber optics to form a compact array.

FIG. 20 shows one embodiment of a transmit array 2001 consisting of FIG. 19 and an attachment to optical fiber cables or strands 2003 that are members of a compact fiber bundle 2005. Fiber optic cables or strands are physically dispersed 2003 and routed to transmit elements 2002.

Figure 21:
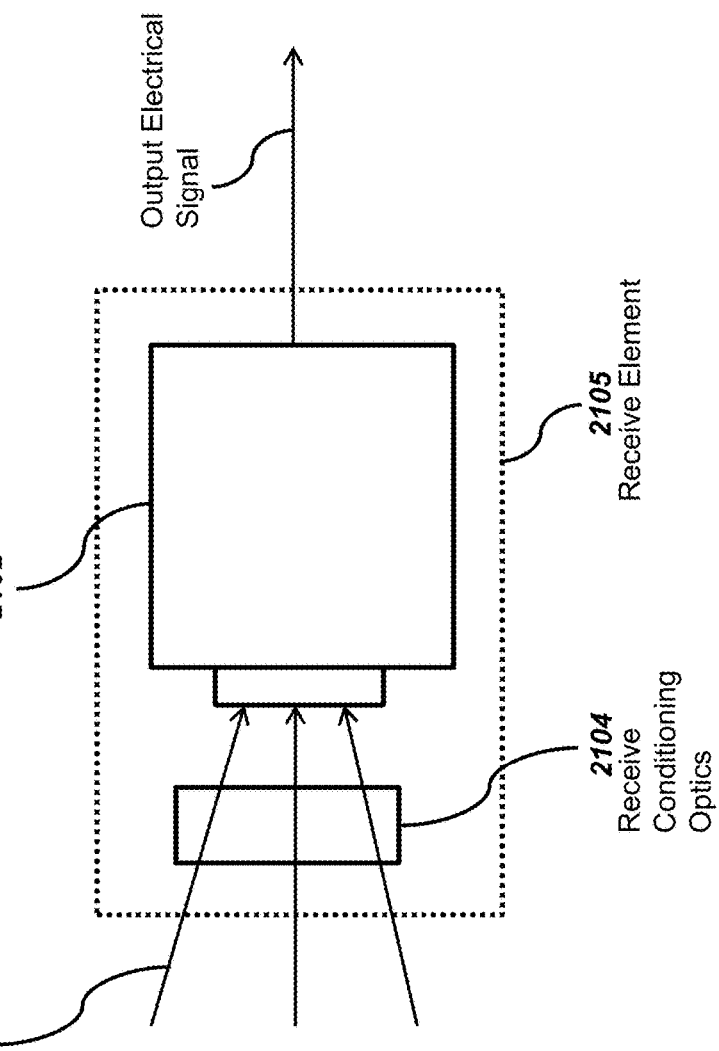
FIG. 21 illustrates a receive element consisting of conditioning optics and a photo-detector.

FIG. 21 shows one embodiment of a receive element 2105 consisting of receive conditioning optics 2104 stage and a photo detector 2102 device such as, but not limited to photo-diodes, phototransistors, photoconductors, and photomultipliers.

Figure 3:
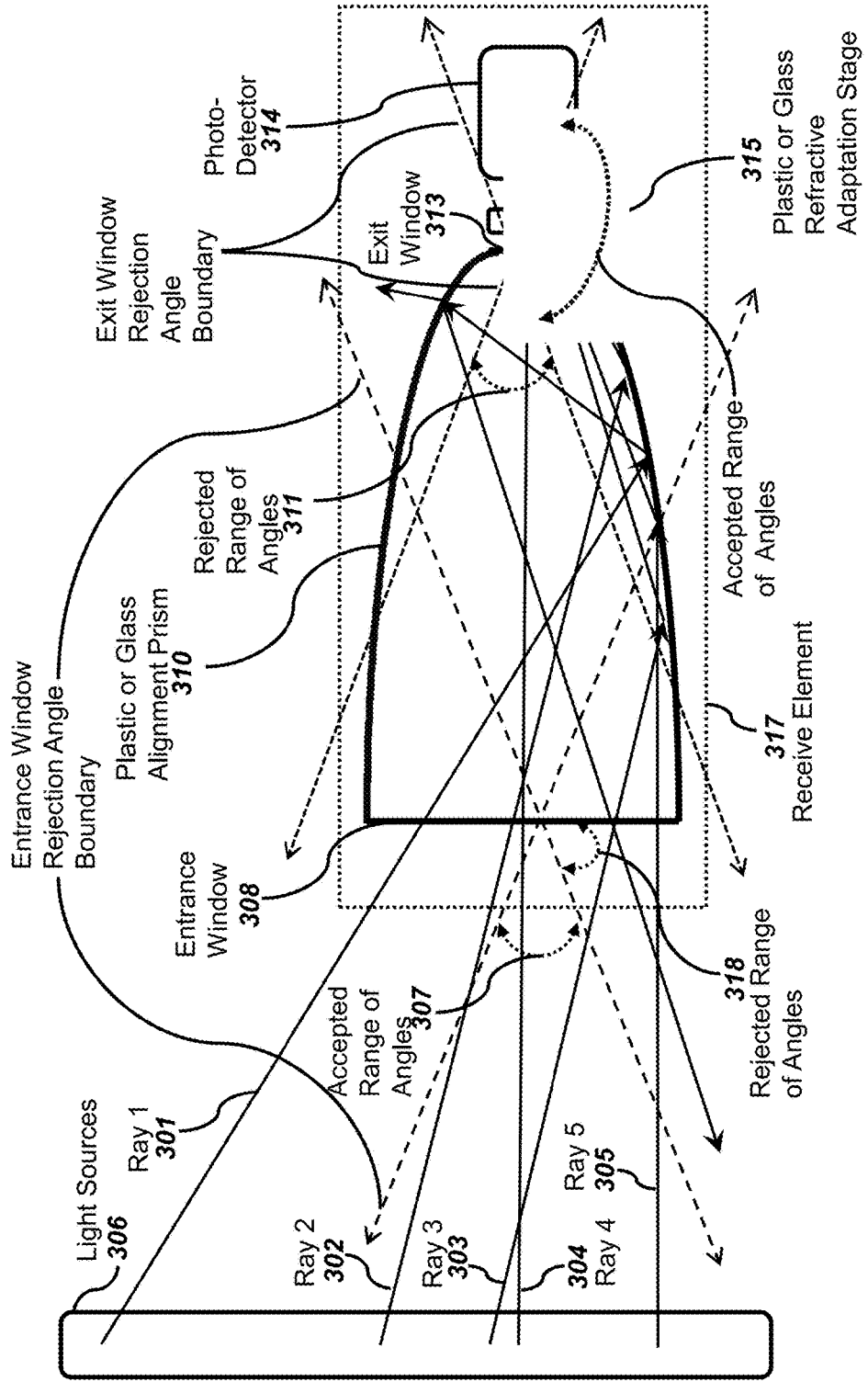
FIG. 3 illustrates a receive element consisting of a photo-detector, refractive adaptation stage, and alignment prism. It also illustrates the accepted range of light ray angles accepted by the receive element.

FIG. 3 shows a preferred embodiment of a receive element 317 consisting of a plastic or glass prism 310 stage, a plastic or glass refractive adaptation stage 315 and a photodetector 314. The prism and refractive adaptation stage 314, 315 have a critical angle of total reflection given by $\sin \phi_c$ n/n' where $\phi_c$ is the critical angle, n is the index of refraction of plastic or glass and n' is the index of refraction of air. Rays of light whose incidence angles greater than $\phi_c$ are totally reflected while those less than are partially refracted. Light sources do not produce a well collimated beam of light and light has an inherent probability distribution of dispersal (diffraction). Light sources illuminate the prism's entrance window 308 and light rays that are less than the critical angle 307 are refracted through the entrance window 308. The interior of the prism 310 directs incoming rays by way of internal reflection that converge on an exit window 313. Rays whose angle is greater than the entrance window accepted angle 307 are rejected by the prism 310 by way of reflection back out the entrance window 308. Ray 1 301 or refraction through the sides of the prism 310. Light rays that are greater than the exit window rejection angle 311 are reflected by the exit window 313 and make their way out the entrance window 308 or are partially refracted out the sides of the prism 310. Light rays that are refracted through the exit window 313 continue on toward a plastic or glass refractive adaptation stage 315. The adaptation stage 315 collimates the light by way of refraction and is detected at the photo detector PD 314.

FIG. 3 further illustrates the effect of incident rays from light sources 306 on the entrance window 308 of the prism 310. The angles of Ray2 302, Ray 3 303, Ray 4 304 and Ray 5 305 are less than the entrance window rejection angle 318. The angle of Ray1 301 is greater than the entrance window rejection angle 318. Ray 4 304 is a lateral and angle aligned ray. Ray 4 304 is transmitted by all stages leading up to the PD 314. Ray 5 305 is an angle aligned, but lateral misaligned ray. The lateral misalignment of Ray 5 305 is less than the width of the entrance window 308. Ray 5 305 is transmitted by the entrance window 308, reflects off the interior side of the prism 310 and is transmitted through the exit window 313 and adaptation stage 315 to the PD 314. Ray 2 302 is an angle misaligned, but lateral aligned ray. Ray 2 302 is transmitted by the entrance window 308, reflects off the interior side of the prism 310 and is transmitted through the exit window 313 and adaptation stage 315 to the PD 314. Ray 3 303 is an angle and lateral misaligned ray. Ray 3 303 is transmitted by the entrance window 308, reflects off the interior side of the prism 310 and is transmitted through the exit window 313 and adaptation stage 315 to the PD 314. Ray 1 301 is an angle and lateral misaligned ray. Ray 1 301 is transmitted through the entrance window 308 and reflects off the interior of the prism 310. Ray 1 301 does not strike the exit window 313, but rather is partially reflected a second time on the interior of the prism 310 and then is transmitted out the entrance window 308.

Figure 22:
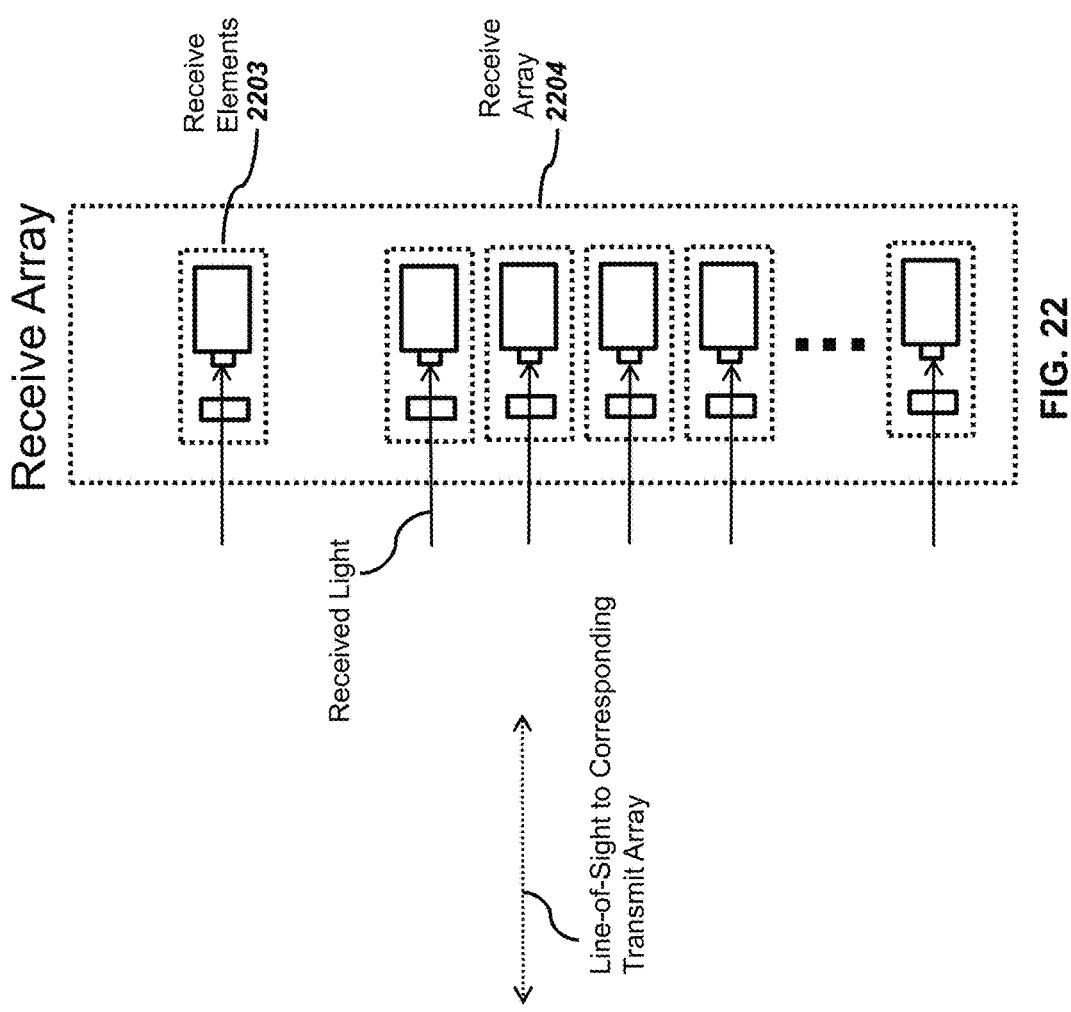
FIG. 22 illustrates a receive array consisting of receive elements of FIG. 21.

FIG. 22 shows one embodiment of a receive array 2204 consisting of a plurality of receive elements 2203 as shown in FIG. 21 or receive elements 317 as shown in FIG. 3. The receive elements 2203 are arranged in a one or two-dimensional array and conform to a plane or curved surface or a combination of planes and curved surfaces.

Figure 23:
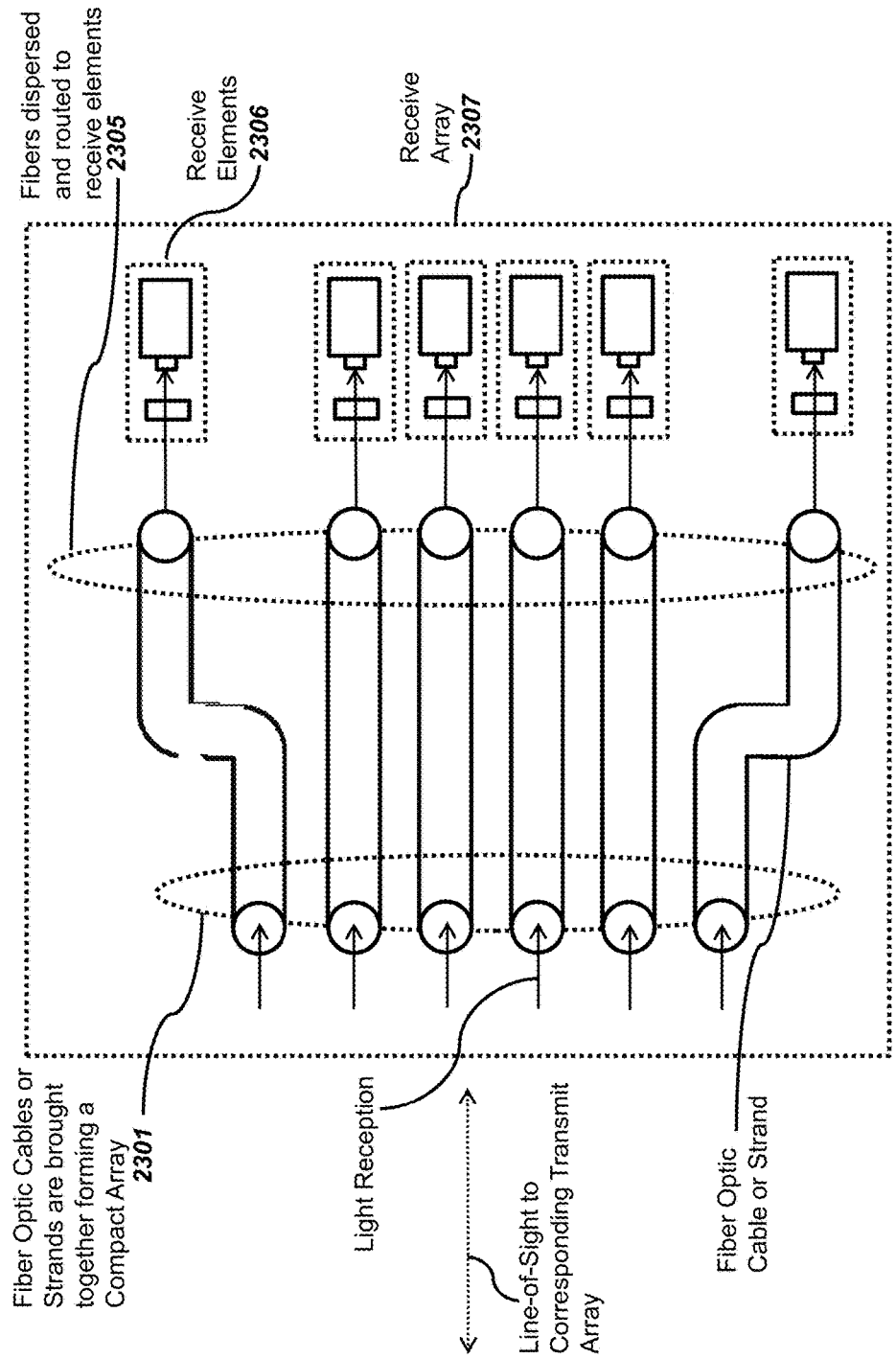
FIG. 23 illustrates a receive array consisting of receive elements of FIG. 21 and fiber optics to form a compact array.

FIG. 23 shows one embodiment of a receive array 2307 consisting of FIG. 22 and an attachment to optical fiber cables or strands 2305 that are members of a compact fiber bundle 2301. Fiber optic cables or strands 2305 are physically dispersed and routed to receive elements 2306.

Figure 24:
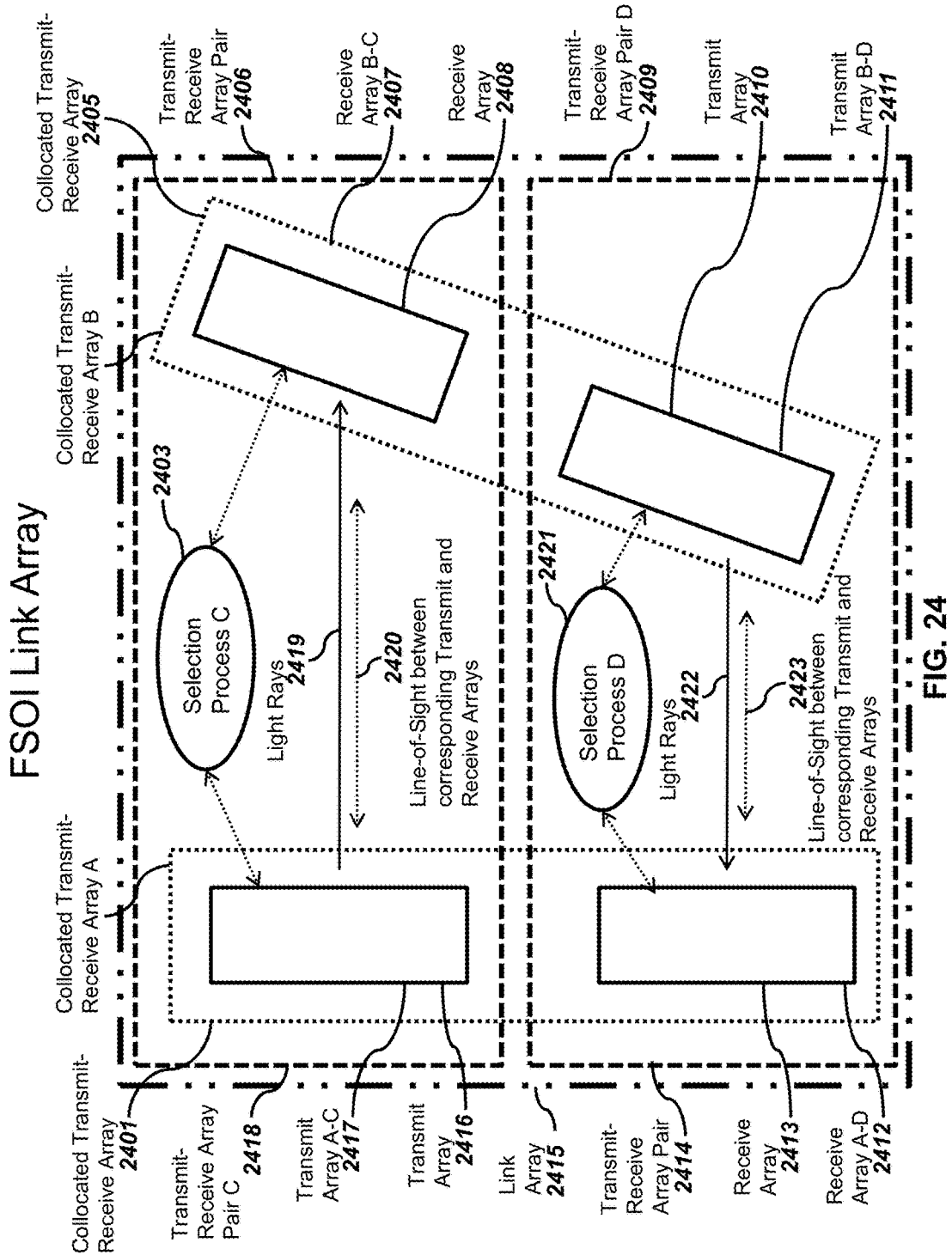
FIG. 24 illustrates a FSOI link array consisting of two transmit-receive array pairs and the selection process that maintains the FSOI links.

FIG. 24 shows a link array 2415 consisting of two transmit-receive array pairs 2414, 2406. Each transmit-receive array pair 2414 consists of an assigned transmit array 2410 and a receive array 2413 separated by line-of-sight distance 2423. A collocated transmit-receive array 2401 consists of a co-located transmit array 2416 and receive array 2413. The link array 2415 forms a plurality free-space optical links (FSOI links) that are used for uni-directional and bi-directional links.

Figure 1:
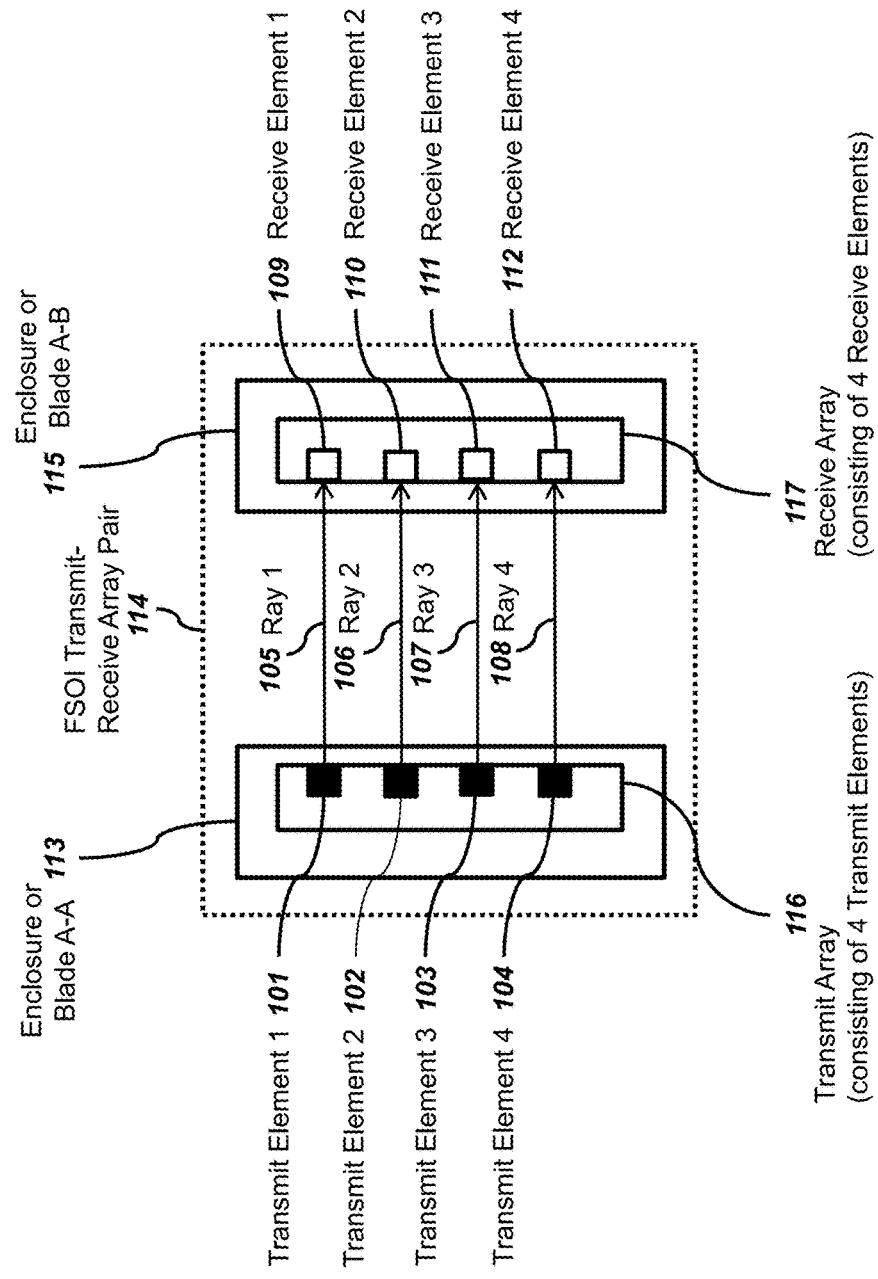
FIG. 1 illustrates a nominally oriented free space optical interconnect between of an array of transmit elements for one enclosure or blade and an array of receive elements for another enclosure or blade.

FIG. 1 shows an example of free-space optical interconnects (FSOI) 114 between blades or enclosures 113, 115 for a system that is positioned and oriented system. Four transmit elements 101, 102, 103, 104 form a transmit array 116. Four receive elements 109, 110, 111, 112 form a receive array 117. Transmit element 1 101 and receive element 1 109 form a transmit-receive pair. Transmit element 2 102 and receive element 2 110 form a transmit-receive pair. Transmit element 3 103 and receive element 3 111 form a transmit-receive pair. Transmit element 4 104 and receive element 4 112 form a transmit-receive pair. For a nominally oriented system as described in this example, there are 4 FSOI links that form an FSOI link array. The light rays 105, 106, 107, 108 associate a receive and transmit element pair 114 as belonging to a uni-directional link whose light energy is the greatest out of all of the transmit elements 101, 102, 103, 104 in the transmit array 116 as detected by the receive elements 109, 110, 111, 112. For example, Ray 1 105 is associated with transmit element 1 101 and receive element 1 109. Transmit element 1 101 has the greatest light energy received at receive element 1 109 out of the 4 transmit elements 101, 102, 103, 104.

Figure 2:
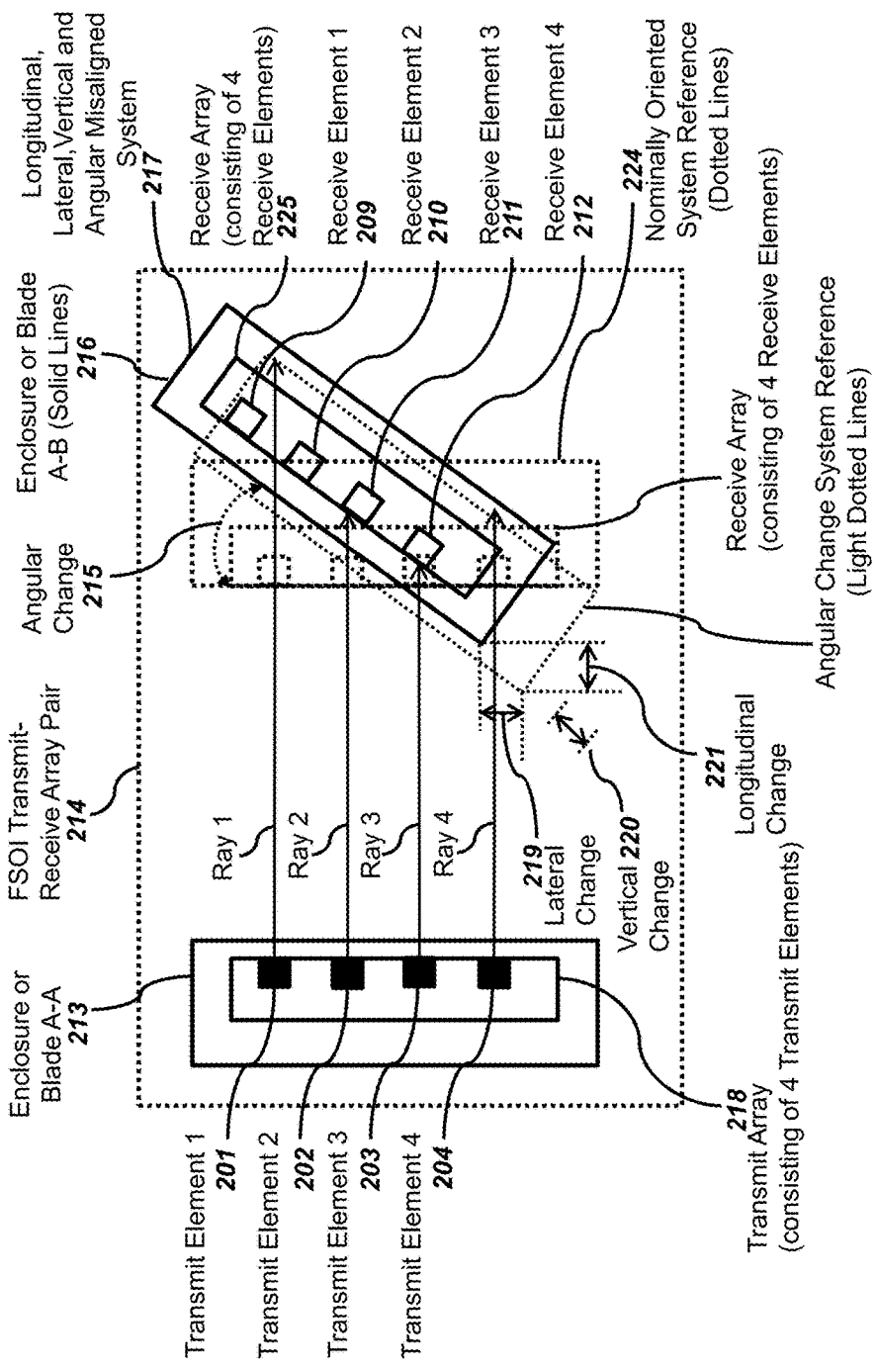
FIG. 2 illustrates a change in position and/or orientation of a free space optical interconnect between of an array of transmit elements for one enclosure or blade and an array of receive elements for another enclosure or blade of FIG. 1.

FIG. 2 shows an example of a change position and orientation of the system 224 of FIG. 1. It illustrates a change in relative position 219, 220, 221 and orientation 215 between the transmit array 218 and the receive array 225. Longitudinal 221, lateral 219, vertical 220 and angular 215 changes cause a change in the relationship between the transmit elements 201, 202, 203, 204 and receive elements 209, 210, 211,212 of the arrays 218, 225. In this example, there is insufficient light energy received at receive element 1 209 to associate it with any transmit element to form a uni-directional link. There is insufficient light energy received at receive element 4 212 to associate it with any transmit element to form a uni-directional link. The greatest light energy received at receive element 3 211 is associated with a transmit element 2 202—a change from transmit element 3 103 in FIG. 1. The greatest light energy received at receive element 4 212 is associated with a transmit element 3 203—a change from transmit element 4 104 in FIG. 1.

Figure 5:
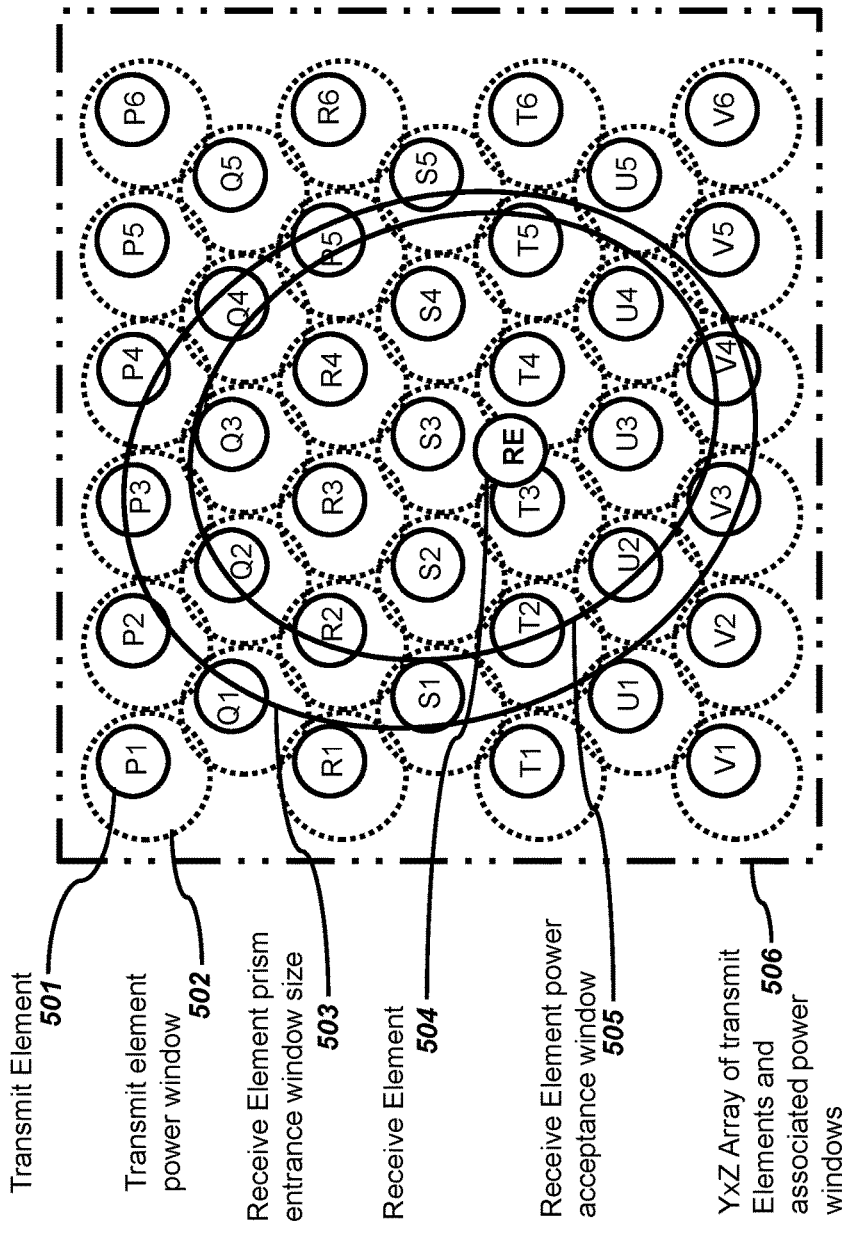
FIG. 5 illustrates for one of the receive elements of FIG. 4, the light power mapping between arrays of transmit and receive elements. It also illustrates additional details such as transmit and receive elements, receive prism entrance window size and power acceptance window size.

FIG. 5 illustrates the mapping between one or more of transmit element power windows 506 and one receive element power acceptance window 505 associated with a transmit-receive array pair 2406. In addition, FIG. 5 shows a one-to-one correspondence between transmit elements 506 and transmit element power windows 506. The transmit element power window 502 is the light energy distribution of the transmit element 501. The receive element power acceptance window size 505 is the window in which light energy represented by the transmit element power windows 506 that are contained within the receive element power acceptance window 505 are detectable by the receive element RE 504. There is a one-to-one correspondence between a receive element power acceptance window 505 and a receive element 504. A receive element RE 504 is contained within the receive element power acceptance window 505. In a preferred embodiment, FIG. 5 shows a one-to-one correspondence between the receive element prism entrance window size 308 of the receive element 317 of FIG. 3 and a receive element prism entrance window size 503. The transmit elements in FIG. 5 consist of an array of Y rows by Z columns 506 of transmit elements, namely P1-P6, Q1-Q5, R1-R6, S1-S5, T1-T6, U1-U5, and V1-V6 contained in their respective transmit element power windows 502. The receive element RE 504 in FIG. 5 is associated with the receive element power acceptance window 505.

Figure 4:
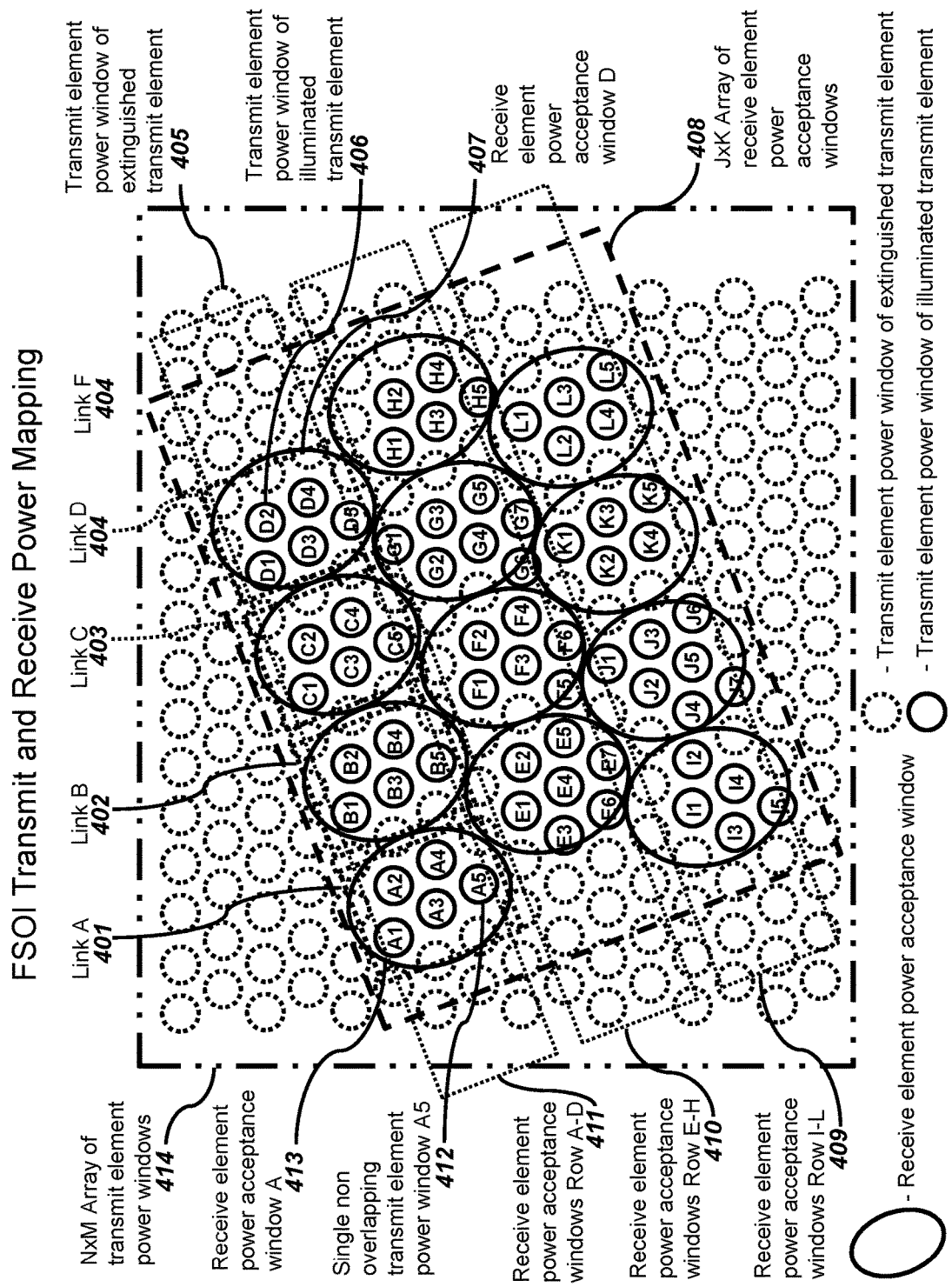
FIG. 4 illustrates for a given position and orientation, the light power mapping between arrays of transmit and receive elements. It also illustrates extinguished transmit elements whose light power bridges between one or more receive elements.

FIG. 4 illustrates an array of multiple receive element power acceptance windows 408 of FIG. 5. FIG. 4 shows the association between transmit element power windows 414 and receive element power acceptance windows 408 that consist of a transmit-receive array pair 2406. FIG. 4 further shows the association between one or more transmit element power windows 406, D1-D5 and one receive element power acceptance window 407 for a relative position and orientation of a transmit-receive array pair 2406. The receive element power acceptance windows 408 consist of an array of J rows by K columns of 3 rows A-D 411, E-H 410 and I-L 409. Each row contains 4 receive element power acceptance windows 409, 410, 411.

The selection process 2403, 2421 illustrated in FIG. 24 includes, but is not limited to the creation and maintenance of one or more uni-directional links for each transmit-receive array pair 2406 2414 as shown in FIG. 24. There are two selection processes 2403, 2421 for each link array 2401 2405 as shown in FIG. 24, namely selection process C 2403 and selection process D 2421. Selection process C 2403 is assigned to transmit-receive array pair C 2418 consisting of transmit array A-C 2417 and receive array B-C 2407 as shown in FIG. 24. Selection process D 2421 is assigned to transmit-receive array pair D 2409 consisting of transmit array B-D 2411 and receive array A-D 2412 as shown in FIG. 24. Selection process C 2403 and Selection process D 2421 communicate and share information that includes, but is not limited to state machines, statistics and control. Communication and sharing of information that includes, but is not limited to the use of shared memory and exchange of messages over links 401, 402, 403, 404 that comprise the link array 2415.

The transmit-receive array pair 2406 selection process 2403 is in part the selection of one or more transmit element power windows 506 and their associated transmit elements 506 that contribute most significantly to the light energy power detected by the photo-detector of one receive element 504, but that do not contribute significantly to the light energy power detected at photo-detectors of other receive elements. Transmit elements 506 that are found to contribute most significantly to the light energy power detected at a photo-detector of a receive element 504 are assigned to the receive element 504 to form a uni-directional link 401. Each transmit element 506 is at most assigned to one and only one receive element 504. Receive elements 504 may have one or more transmit elements 506 assigned to them. Transmit elements that contribute significantly to the light energy power detected at photo-detectors of multiple receive elements are extinguished and are not assigned to any receive elements. There are one or more uni-directional links formed for any given transmit-receive array pair 2406.

For example, FIG. 4 illustrates that Link A 401 comprises an association between the receive element power acceptance window A 413 and 5 transmit element power windows, namely A1, A2, A3, A4 and A5. The receive element power acceptance window A 413 is further associated with it's respective receive element RE 504 as illustrated in FIG. 5. Links can be bonded to form composite links. From FIG. 4, an example of a composite link consists of link A 401, link B 402, link F 410 F, and link J 409 J.

As the relative position and orientation between a transmit array 2416 and receive array 2408 of a transmit-receive array pair 2406 may change over time, the selection process 2403 runs continuously revising transmit element and receive element link associations. Transmit elements 506 that are not associated with links are momentarily illuminated in groups of one or more to detect a change in the contribution of the light energy power detected at photo-detectors of receive elements 504. Transmit elements 506 that are associated with links 401 are momentarily extinguished in groups of one or more to determine a change in the contribution of the light energy power detected at photo-detectors of receive elements 504. The link associations are continuously updated. The change in associations include, but are not limited to a change in position, orientation or changes in the operation of devices that constitute the transmit element 501 or receive element 504. The potential increase in link error rate of selective illumination and extinguishment of transmit elements 506 does not exceed the link error rate threshold to make any links inoperable.

Each link array 2415 supports a one or more uni-directional point-to-point links. Uni-directional links between transmit-receive array pairs 2418, 2409 of a link array 2415 can form one or more bi-directional point-to-point links. For each link array 2415 a physical layer provides, but is not limited to framing, bonding, striping, lanes, and data redundancy such as hamming codes. For each link array 2415 a data link layer interoperates with the physical layer that provides layer 2 functions that include, but are not limited to defined link message set and procedures for use by the selection process 2403, 2421 for message and information exchange. The message set and procedures include, but are not limited to the transfer of state, control and statistics information over the links. Point-to-point messages that are used for link management and the selection process 2403, 2421 are replicated across all links of the link array 2415. Momentary illumination or extinguishment of a transmit element 501 for updating link associations may increase the error rate of data transfer over the link. Redundancy in the data transmission at the physical and data link protocol layer provide an error tolerance such that data transmission and the selection process 2403, 2421 operate reliably and concurrently. A unique identifier is used in data link frames for the group of transmit elements 401, A1-A5 associated with a receive element 413 for a uni-directional link 401. A unique identifier is used in data link frames for multicast over all uni-directional links that comprise the link array 2415.

Minor changes of position and orientation are caused by, but not limited to thermal expansion or contraction of equipment. Minor changes also include changes in the operation of transmit elements 506 and receive elements 504. Major changes are caused by, but not limited to altered equipment position and orientation in excess to minor alignment changes. Altered equipment position and orientation results from, but is not limited to shifting blades within a chassis, sagging floors on which the equipment stands, personnel interference, and earthquakes.

The selection process 2403 stores a map of previous and current assignment between transmit elements 506 and receive elements 504 along with, but not limited to the transmit element power window 502 distribution for all illuminated transmit elements detected at the receive elements 2203. The selection process 2403 also records the number and location of illuminated transmit elements 506 within the array 506. The selection process 2403 also stores the relative position and orientation of the transmit-receive array pair 2406. This includes, but is not limited to longitudinal, lateral, vertical, and angular parameters. In addition, the selection process 2403 records the number and location of extinguished transmit elements 506. The selection process 2403 records statistics of, but is not limited to error rates and type of errors for all uni-directional links that comprise the transmit-receive array pair 2406.

The error rate tolerance at the physical and data link layers of the link is sufficient such that the error rate change due to a minor change does not exceed an error threshold of the link. A minor change is detected as a change in the error rate that does not exceed the error rate tolerance threshold for an operational link. The selection process 2403 compares the difference between the previous and current maps and makes changes to the associations between transmit elements 506 and receive elements 504 that comprise any one uni-directional link of the transmit-receive array pair 2406. These changes include but are not limited to assignment, reassignment or non-assignment of transmit elements 506 to receive elements 504 and the activation by illumination and deactivation by extinguishment of transmit elements 506. A major change is detected as a change in the error rate that exceeds the error rate tolerance threshold for an operational link. In addition to an error rate threshold exceeded, the selection process 2403 compares the previous map to the current map and the position and orientation of the physical locations of transmit and receive elements to calculate the amount of position and orientation change that occurred. A revised map is created for the position and orientation change information. The selection process 2403 modifies the assignment and location and number of transmit elements to be illuminated or extinguished to adjust for the spatial orientation change.

Information about each transmit array 2416 and receive array 2408 of the transmit-receive array pair 2406 is stored for use by the selection process 2403. The information includes, but is not limited to physical, electrical, and light detection and emission properties, light dispersion properties, device type, device manufacturing date, spatial arrangement and physical dimensions of transmit elements and receive elements. Included are a group of one or more illumination templates that are used to provide communication over a defined range of relative position and orientation of the transmit array 2416 and receive array 2408 of the transmit-receive array pair 2406. One of the illumination templates in the group is the default template. Between the templates, there is one or more that can be used for any position or orientation to provide at least one operable link. The templates are used by the selection processes 2403 to discover the position and orientation of the link array 2415.

There are two selection processes 2403, 2421 for each link array 2415. One selection process 2403 for each transmit-receive array pair 2418. The two selection processes 2403, 2421 share information that includes, but is not limited to the illumination pattern at the receive array 2408, selection process state, statistics, link error rates, data link messages, physical layer state, transmit element and receive element associations for each link.

One selection process 2403 for a transmit-receive array pair 2418 detects when the other selection process 2421 for an associated transmit-receive array pair 2409 of a link array 2415 has applied it's default illumination template by comparing the received power distribution over the receive elements 504. Even when the links are not sufficiently reliable in either direction of the link array 2415, the default template as it is detected at the receiving side is used to convey the relative position and orientation of the transmit-receive array pair 2406. When links are not sufficiently reliable in either direction of the link array 2416, the selection processes 2403, 2421 communicate to one another by sequencing the illumination and extinguishment of transmit elements 506 in pre-defined patterns. The patterns and their combined power fluctuations at the receive array 2408 are detected by the selection process 2403. Sets of patterns and power fluctuations constitute a message set. The message set is used by a selection process 2403, 2421 when there are insufficient reliable links in the link array.

Figure 15:
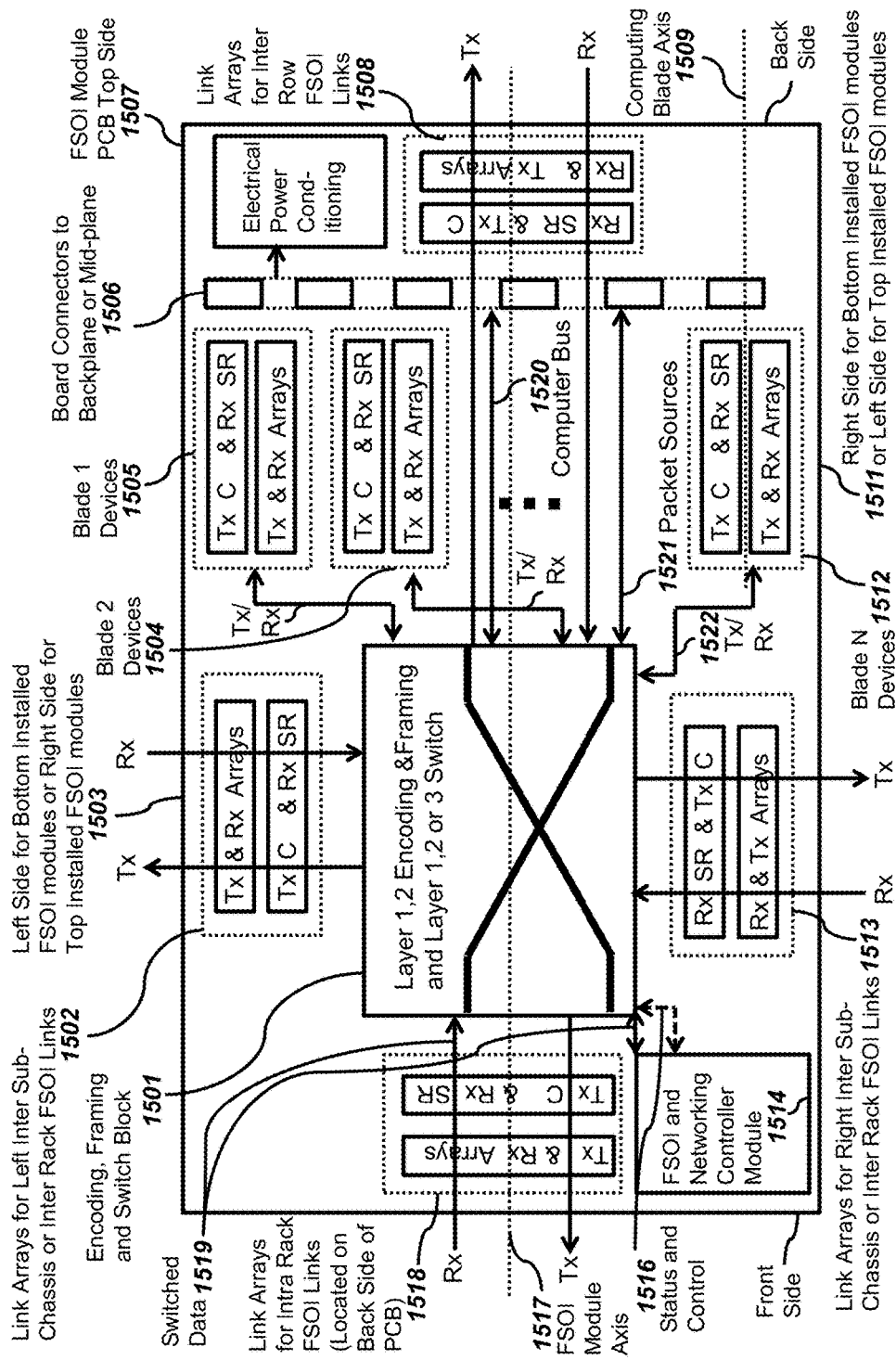
FIG. 15 illustrates the block diagram of a printed circuit board consisting for an FSOI module.
Figure 17:
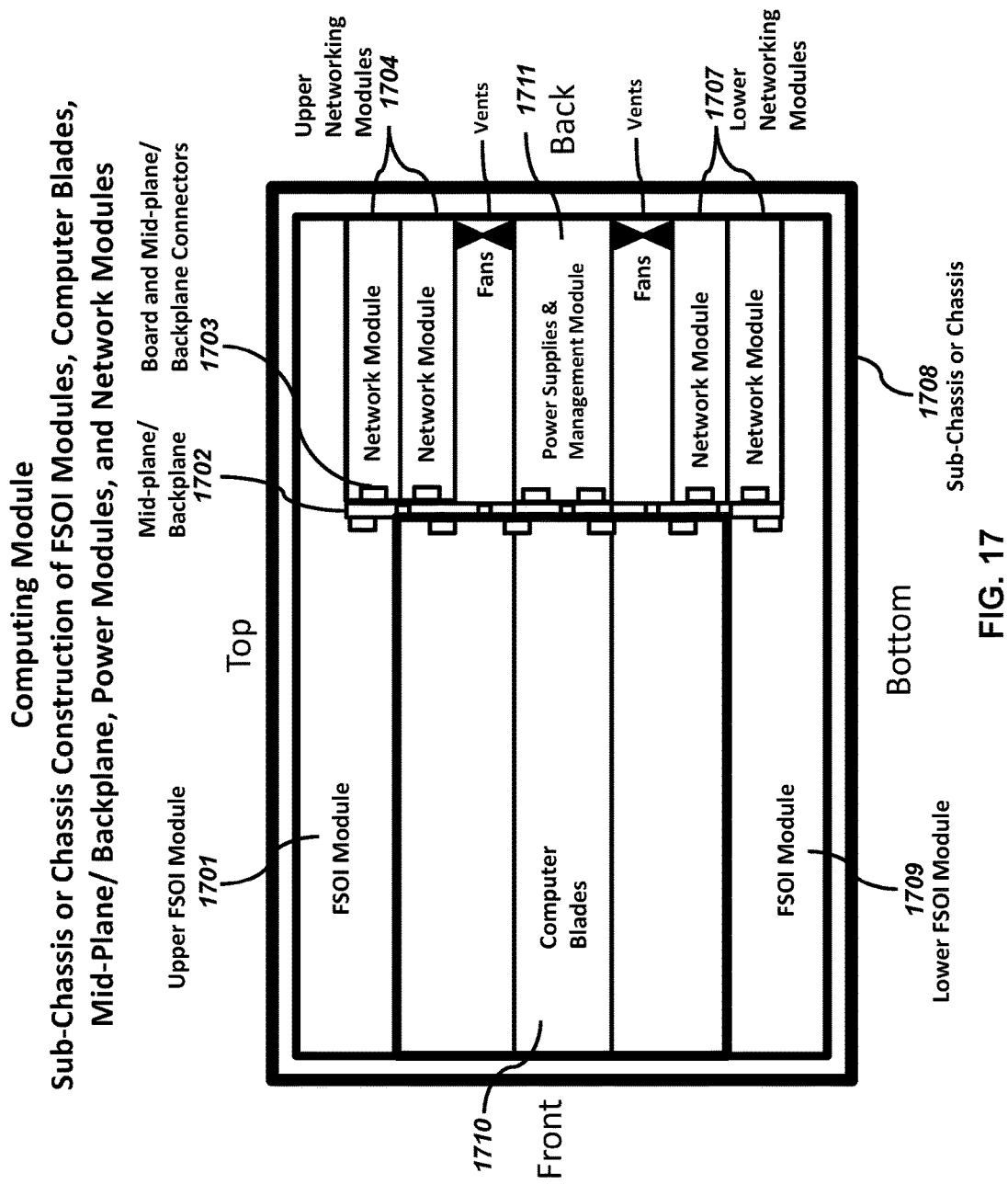
FIG. 17 illustrates the sub-chassis or chassis construction of FSOI modules, computer blades, mid-plane/backplane, power modules and network modules.

FIG. 15 shows a block diagram of the printed circuit board 1507 for the FSOI module 1302. It consists of multiple subsystems—a layer 1, 2, or 3 switch 1502, FSOI transmit and receive circuitry 1518, 1502, 1508, 1513, 1505, 1512, backplane/mid-plane connectors 1506, cabled networking module, electrical power conditioning and control module 1514 for FSOI link management and networking control. In a preferred embodiment, there are four FSOI link arrays for external communication to other FSOI modules— right Inter sub-chassis or Inter-rack FSOI links 1513, intra-rack FSOI links 1518, left inter sub-chassis or inter-rack FSOI links 1502 and inter-row FSOI links 1508. In one embodiment, there is a plurality of FSOI link arrays for external communication to other FSOI modules—right Inter sub-chassis or Inter-rack FSOI links 1513, intra-rack FSOI links 1518, left inter sub-chassis or inter-rack FSOI links 1502 and inter-row FSOI links 1508. There is a plurality of FSOI link arrays 1505, 1504, 1512 for internal communication with computer blades 1710 or between FSOI modules 1701, 1709 contained in the same computing module. The line-of-sight between two FSOI modules 1701, 1709 contained in the same computing module when empty blade slots exist are used to transfer data up and down the rack. The FSOI transmit circuitry consists of transmit signal conditioning and transmit arrays. The FSOI receive circuitry consists of receive arrays and receive signal recovery. Placement of transmit and receive arrays 2417, 2411, 2407, 2412 between blades and FSOI Modules are such that they form link arrays 2415 and have a clear line-of-sight. Placement of transmit and receive arrays 2417, 2411, 2407, 2412 between FSOI Modules are such that they form link arrays 2415 and are nominally orthogonal to the line-of-sight between them. The encoding, framing and switch block 1501 shown in FIG. 15 contains layer 1 and 2 protocol functions which include, but are not limited to encoding, framing and date link protocols. It also contains the logic for switching at the layer 1, 2, or 3 level or a combination of layer 1, 2, or 3 levels. It switches data 1522 1519 from sources such as, but not limited to FSOI links 1502, 1508, 1513, 1518, 1504, 1505, 1512, FSOI and networking controller module 1514 and packet sources 1521 internal to the chassis 1708 across the backplane/mid-plane 1506 as shown in FIG. 15 or network module 1704, 1707 as shown in FIG. 17. The FSOI and networking controller module 1514 manages all functions on the FSOI module printed circuit card 1507 including, but not limited to management of all FSOI links 1502, 1508, 1513, 1518, 1504, 1505, 1512, management of layer 1 encoding, transmit conditioning, receive signal recover, and the layer 1, 2 or 3 switch 1501, statistics and control 1516. Management of the FSOI links 1502, 1508, 1513, 1518, 1504, 1505, 1512 includes, but is not limited to the selection process 2403, 2421, management of the FSOI link physical and data link layers and transmission and reception of FSOI point-to-point data link layer frames and packets. The backplane/mid-plane connectors 1506 connect to the same backplane/mid-plane 1702 that connects to computer blades 1710. The backplane/mid-plane connections 1506 provide electrical power, computer bus signals 1520, and switched data link signals 1521. In one embodiment, the FSOI module printed circuit board 1507 design uses tabulations 1517, 1511, 1503 for upper and lower FSOI modules 1701, 1709.

Figure 13:
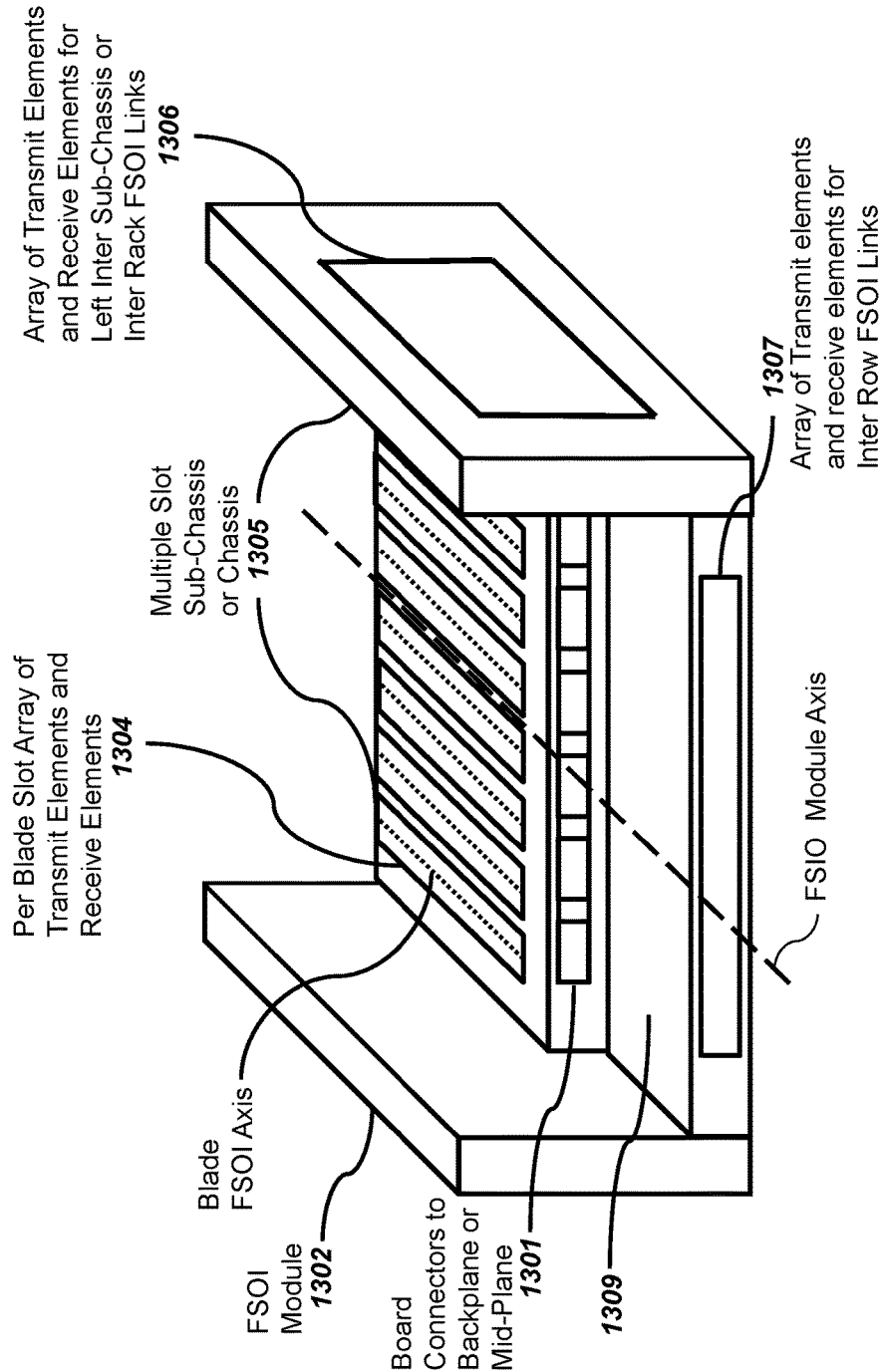
FIG. 13 illustrates the blade side, left and rear view of an FSOI module.

FIG. 13 shows an FSOI module 1302. The FSOI module 1302 consists of a FSOI printed circuit board 1507 and housing 1309. The housing 1309 provides, but is not limited to EMI/RFI shielding, control over air flow cooling, and insertion/removal from the backplane/mid-plane 1702 of the chassis. Cut-outs are located for the link arrays 1306, 1307 and backplane/mid-plane connectors 1301. The perspective of FIG. 13 shows the back, left side and top of the FSOI module 1302. The cut-outs 1304 for blades appear on the top 1305. The cut-outs for the link arrays 1307 that appear on the extended back are for intra chassis FSOI links 1508 between rows of racks. The cut-outs for the link arrays 1306 that appear on the side are for intra chassis FSOI links 1502 between chassis within a row of racks.

Figure 14:
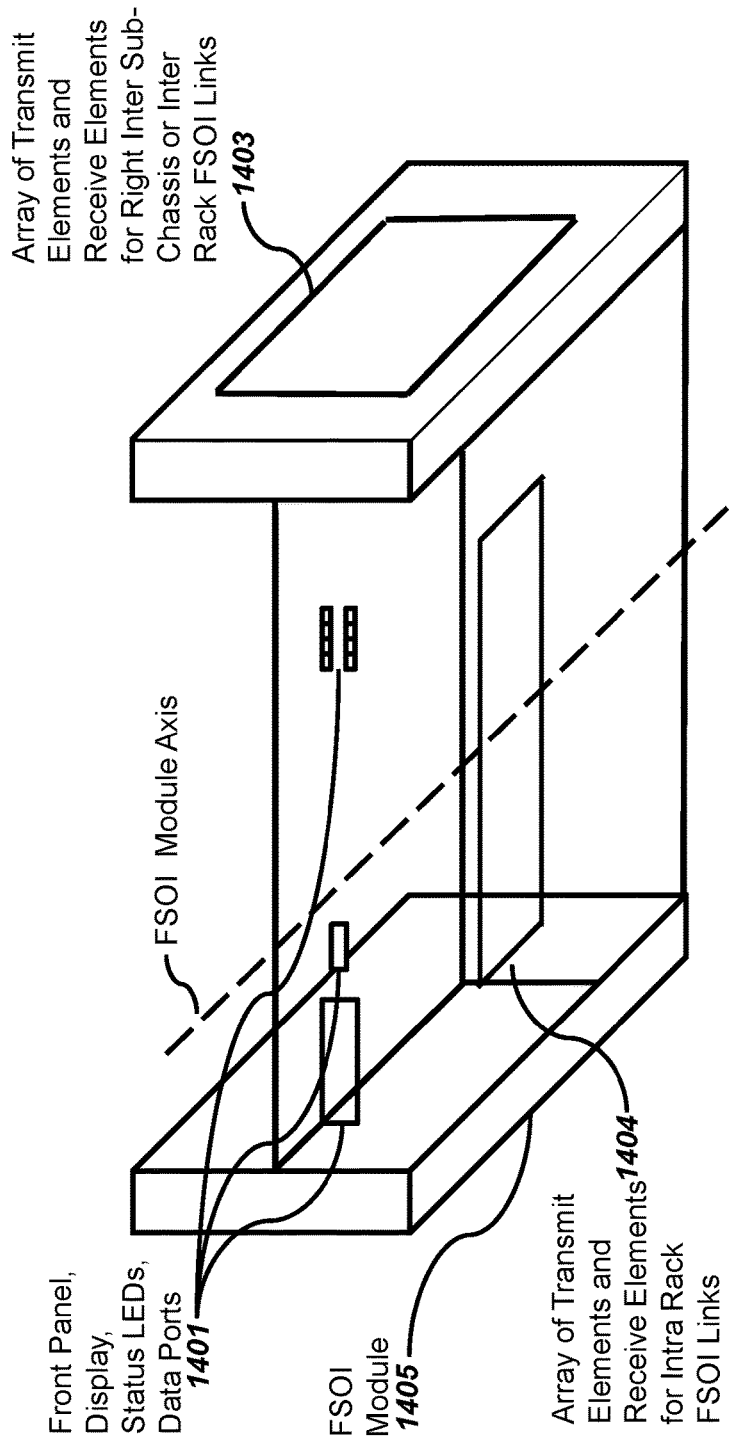
FIG. 14 illustrates the right, bottom and front view of an FSOI module.

The perspective of FIG. 14 shows the front, right side and bottom of the FSOI module 1405. The cut-outs for the link arrays 1404 that appear on the extended bottom are for intra chassis FSOI links 1518 between chassis within the same column of a rack. The cut-outs for the link arrays 1403 that appear on the side are for intra chassis FSOI links 1513 between chassis within a row of racks. The front panel 1401 shows a display, status LEDs, and data ports.

FIG. 17 shows a side view of a sub-chassis or chassis 1708. A backplane/mid-plane 1702, 1703 connects to two FSOI modules 1701, 1709, a plurality of computer blades 1710, power supplies and management module 1711 and additional networking modules 1704, 1707. Networking modules 1704, 1707 may be legacy networking modules or networking modules to expand the number of FSOI links and bandwidth to a chassis located on another row. An FSOI module is installed at the top 1701 and bottom 1709 of the chassis 1708. In one embodiment, the computer blades 1710 contain no circuitry for FSOI links. Network data is passed between blades 1710 and the FSOI module 1701, 1702 through the backplane or mid-plane 1702 or through network modules 1704, 1707. Network ports contained on the FSOI module 1701, 1709 are cabled to network modules 1704, 1707 for passing network traffic.

Figure 16:
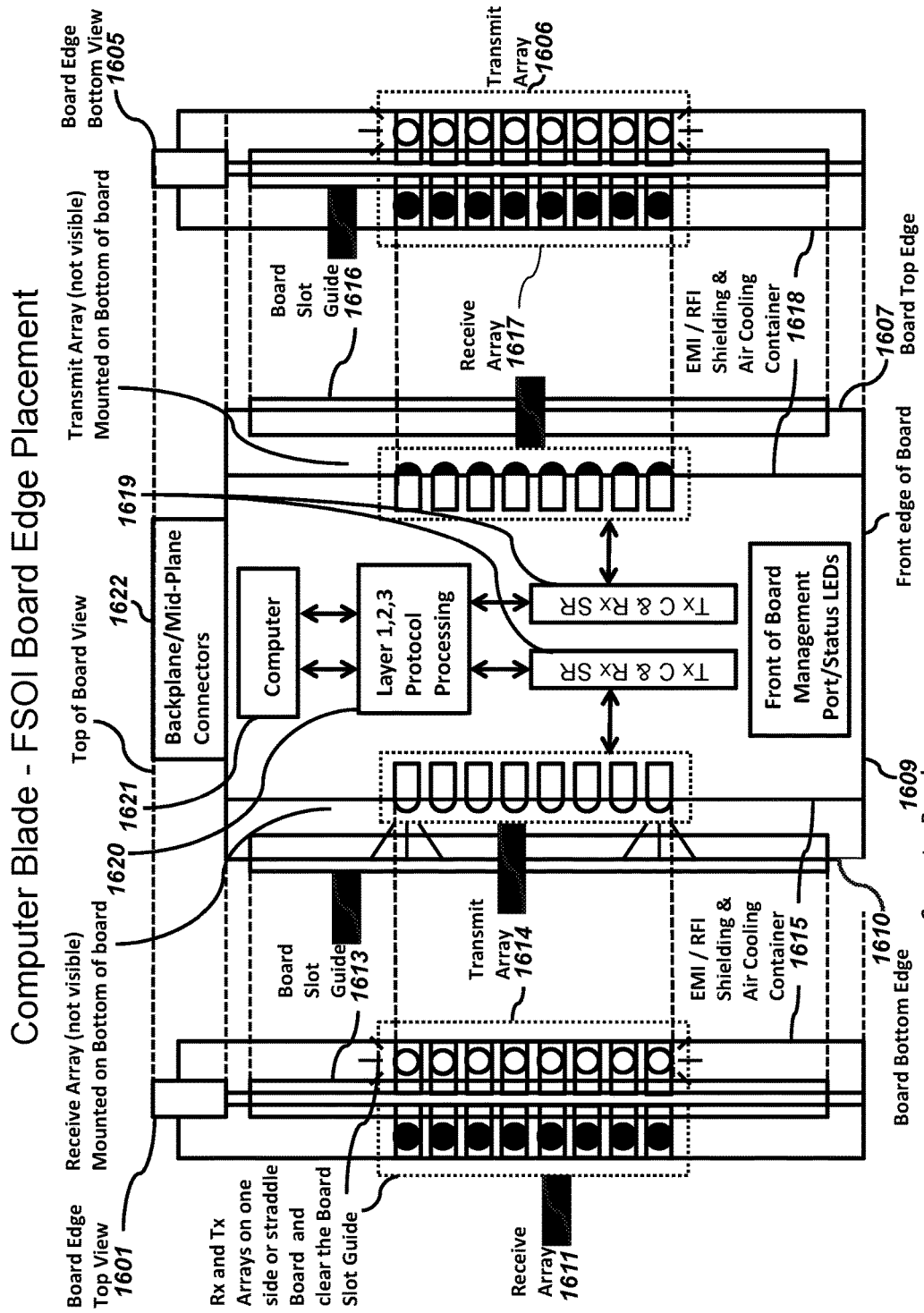
FIG. 16 illustrates the FSOI board edge placement for a computer blade.

FIG. 16 shows the placement of collocated transmit-receive arrays 1611, 1614, 1617, 1606 on a computer blade 1609. Transmit elements 1614, 1606 and receive elements 1617, 1611 are located along the top 1601, 1607 and bottom 1605, 1610 side edges of the blade 1609 near the board slot guides 1613, 1616 of the chassis. They are mounted at a height off the board plane to clear the board slot guides and form a line-of-sight pathway between them and the printed circuit board 1507 of the FSOI module as shown in FIG. 15. They are further positioned such that they oppose the transmit and receive elements 1512 on the FSOI module printed circuit board 1507 and have a clear line-of-sight to form a link array 2415 as shown in FIG. 24. In one embodiment for a collocated transmit-receive array 2401, transmit elements 1614 are grouped together on one side of the blade 1609 and receive elements 1611 are grouped together on the opposite side of the blade 1609. In one embodiment for a collocated transmit-receive array 2401, transmit and receive elements are grouped together on the same side of the blade. Packets received by the receive elements 1617, 1611 are processed by the receive signal recovery circuitry 1619 and then are forwarded to the data link block 1620 in FIG. 16. The layer 1, 2 and 3 protocol processing 1620 manages the FSOI links and provides layer 1, 2, and 3 switching 1620 between the blade computer 1621 and FSOI links. This includes traffic traversing the blade between FSOI modules 1701, 1709. The computer 1621 forwards packets to the data link block 1620 in FIG. 16 for transmission. The data link block 1620 forwards packets for transmit conditioning 1619 and subsequent transmission by the transmit element 1614. EMI/RFI shielding 1615, 1618 surrounds the computer blade with cut-outs for the transmit and receive elements 1611, 1614, 1617, 1606. There are additional cut-outs 1615, 1618 for air cooling. Connectors 1622 are used to insert the blade into a backplane/mid-plane 1702.

FIG. 6A and FIG. 6B show the components that comprise a computing module.

FIG. 6A show a sub-chassis computing module 613 consisting of a computer blade 615, a sub-chassis 614, an FSOI module 617 and FSOI links 616. FSOI links 616 are one or more bi-directional link arrays. The computing module 613 is constructed with one or more computer blades 635 S contained in a sub-chassis 636 sC. and two FSOI modules 605, 610 F—one at the top of the sub-chassis 636 sC and one at the bottom of the sub-chassis 636 sC. FSOI links 601, 602, 603, 604, 606, 607, 608, 609, 611, 612 are formed between computing modules, FSOI modules 605, 610 and computer blades 635, and FSOI modules 605, 610 F contained in the same sub-chassis 636 when blade slots 1305 are not occupied. The left and right upper and lower inter sub-chassis FSOI links 601, 604, 607, 609 are for link connections with other computing modules in the same row. The top and bottom upper and lower inter sub-chassis FSOI links 602, 608 are for link connections with other computing modules in the same column.

FIG. 6B show a chassis computing module 623 consisting of a computer blade 634, a chassis 631, an FSOI module 632 and FSOI links 633. FSOI links 633 are one or more bi-directional link arrays. The computing module 623 is constructed with one or more computer blades 638 S contained in a chassis 637 C. and two FSOI modules 622, 628 F—one at the top of the chassis 637 C and one at the bottom of the chassis 637 C. FSOI links 618, 619, 620, 621, 624, 625, 626, 627, 629, 630 are formed between computing modules, FSOI modules 622, 628 and computer blades 638, and FSOI modules 622, 628 contained in the same chassis 637 when blade slots 1305 are not occupied. The left and right upper and lower inter chassis FSOI links 618, 621, 624, 627 are for link connections with other computing modules in the same row. The top and bottom upper and lower inter chassis FSOI links 619, 626 are for link connections with other computing modules in the same column.

Figure 7:
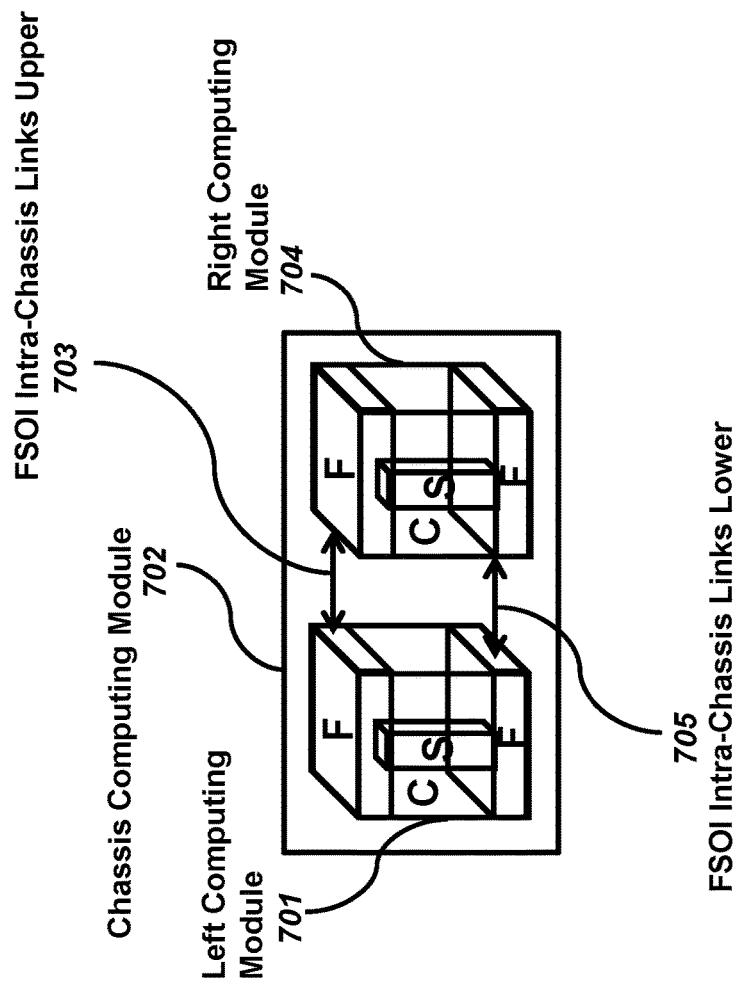
FIG. 7 illustrates the construction of a chassis computing module consisting of two side by side computing modules. It also illustrates the FSOI links between the computing modules.

FIG. 7 shows the construction of a chassis computing module 702 comprising two side-by-side sub-chassis computing modules 701, 704 as defined in FIG. 6 in the same row and installed in one rack. The FSOI links 703, 705 shown are the links between the two sub-chassis computing modules 710, 704.

FIG. 8A shows the construction of a rack 801 consisting of sub-chassis computing modules 808 as shown in FIG. 7. Each row of the rack 802, 805, 806, 807 consists of two side-by-side sub-chassis computing modules 815 forming two columns. The vertical FSOI links 804, 803 shown are the links between the sub-chassis computing modules 802, 805, 806, 807 in the column. The horizontal FSOI links 816 shown are the links between the sub-chassis computing modules in the row 807.

FIG. 8B shows the construction of a rack 809 consisting of chassis computing modules 817 as shown in FIG. 6B. The rack consists of one column of chassis computing modules 810, 812, 813, 814 forming one column of chassis computing modules 809. The vertical FSOI links 811 shown are the links between the chassis computing modules 810, 812 in the column.

FIG. 9A illustrates two failure modes 902, 903 between two adjacent sub-chassis computer modules as shown in FIG. 7. The failed route 903 of network traffic is caused by a failed FSOI module 901 or failed FSOI link 902. The network traffic is rerouted over the alternate route 906 whose FSOI module 905 and FSOI link 907 are operational.

FIG. 9B illustrates three failure modes 916, 915, 923 between two sub-chassis computer modules as shown in FIG. 6B within a rack 911. The failed route 913 of network traffic is caused by a failed computer module 923, failed FSOI module 915 or failed FSOI link 916. The network traffic is rerouted over the alternate route 917 whose FSOI module and FSOI link along the path are operational.

Figure 10:
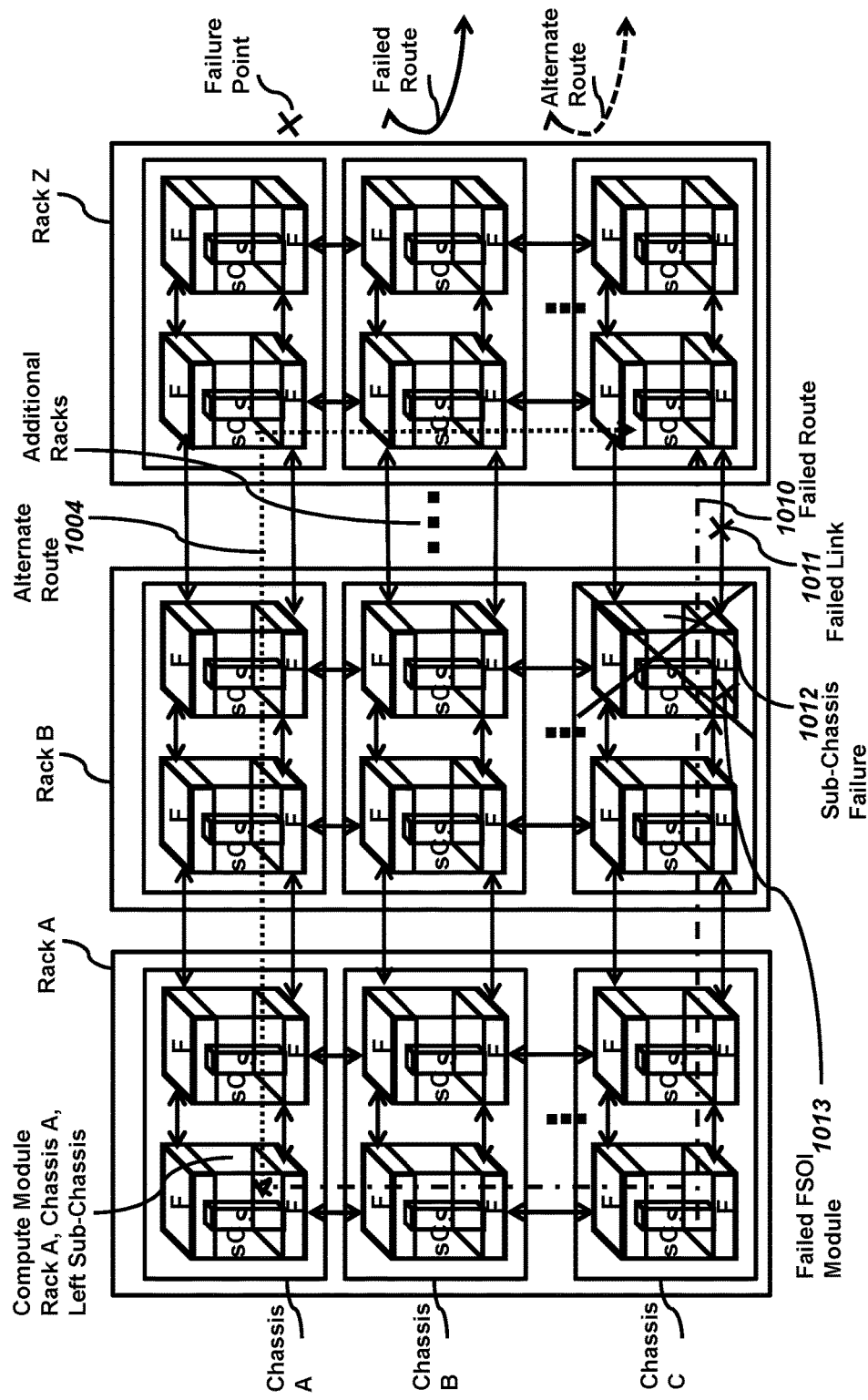
FIG. 10 illustrates the rerouting of communication data over alternate FSOI links between computing modules between racks for failed FSOI links or failed computing module.

FIG. 10 illustrates three failure modes 1011, 1013, 1012 between two sub-chassis computer modules 1012, 1011 between racks as shown in FIG. 8*a* within a row. The failed route 1010 of network traffic is caused by a failed computer module 1012, failed FSOI module 1013 or failed FSOI link 1011. The network traffic is rerouted over the alternative route 1004 whose FSOI modules and FSOI links along the path are operational.

Figure 11:
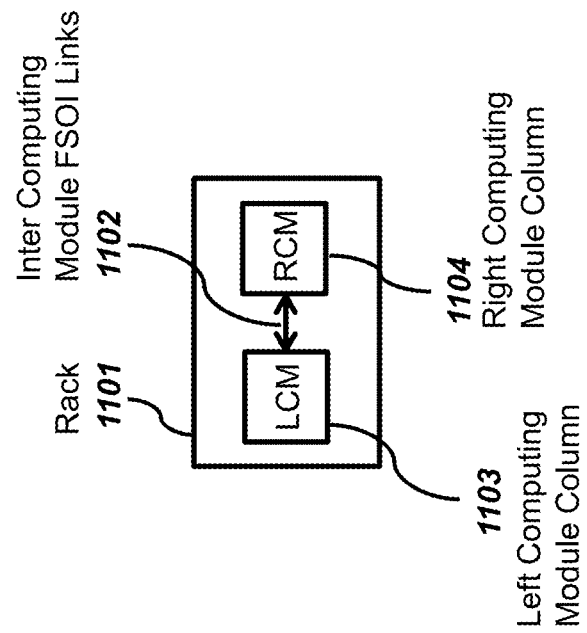
FIG. 11 illustrates the overhead rack view of two side by side computing module columns.

FIG. 11 illustrates the rack view from above the rack 1101. The rack contains two columns of computer modules—the left computing module 1103 and the right computing module 1104. The left and right computing modules 1103, 1104 are connected with FSOI links 1102 horizontally and vertically within the rack.

Figure 12:
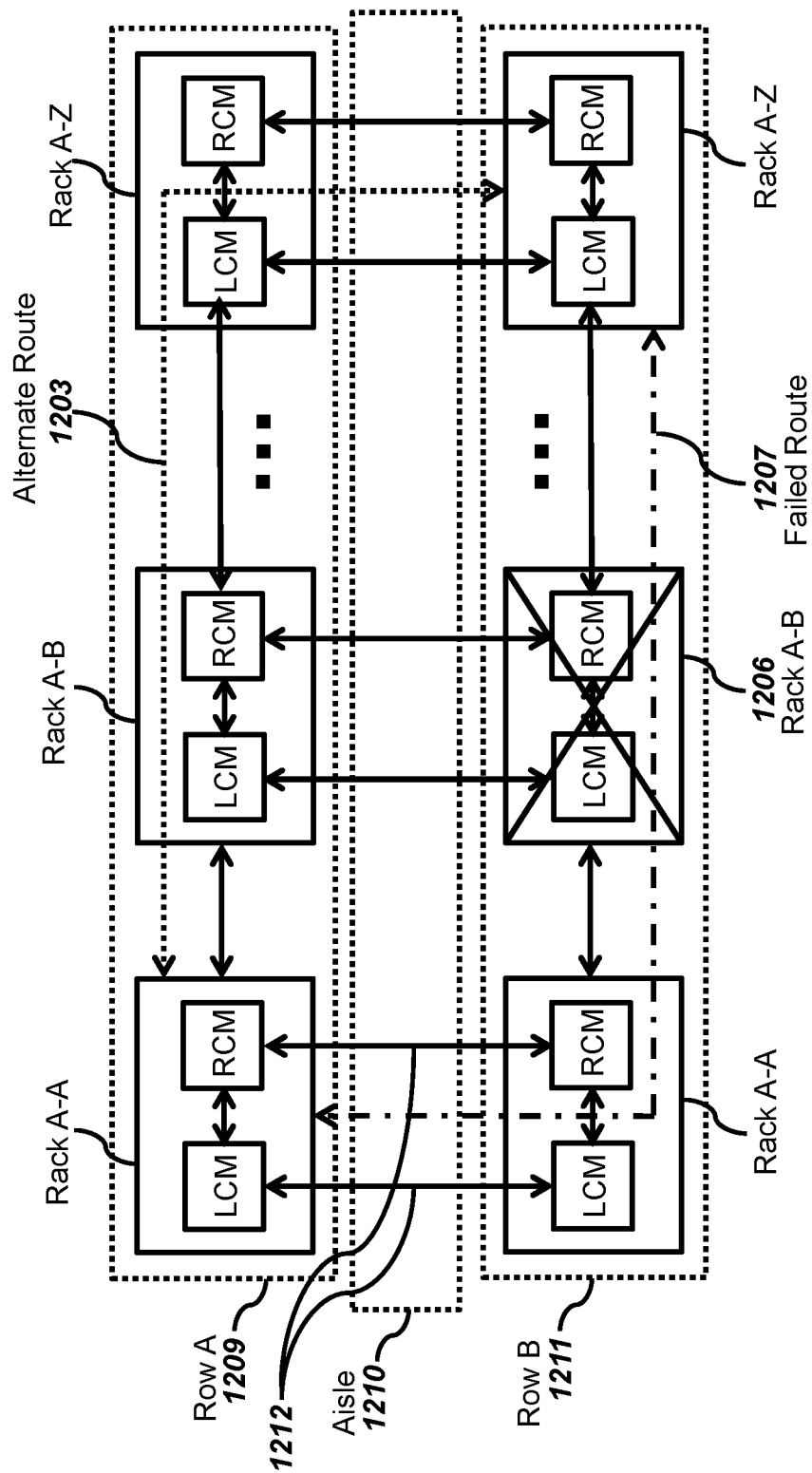
FIG. 12 Illustrates the rerouting of communication data over alternate FSOI links between computing modules between rack rows for failed FSOI links or failed rack of computing modules.

FIG. 12 illustrates a row view of two rows of racks as shown in FIG. 11. The rows 1209, 1211 are separated by an aisle 1210. FSOI links 1212 connect two racks from each row. FIG. 12 also illustrates a rack failure 1206. The failed route 1207 of network traffic is rerouted to an alternate route 1203 whose racks and FSOI links are operational.

Figure 25:
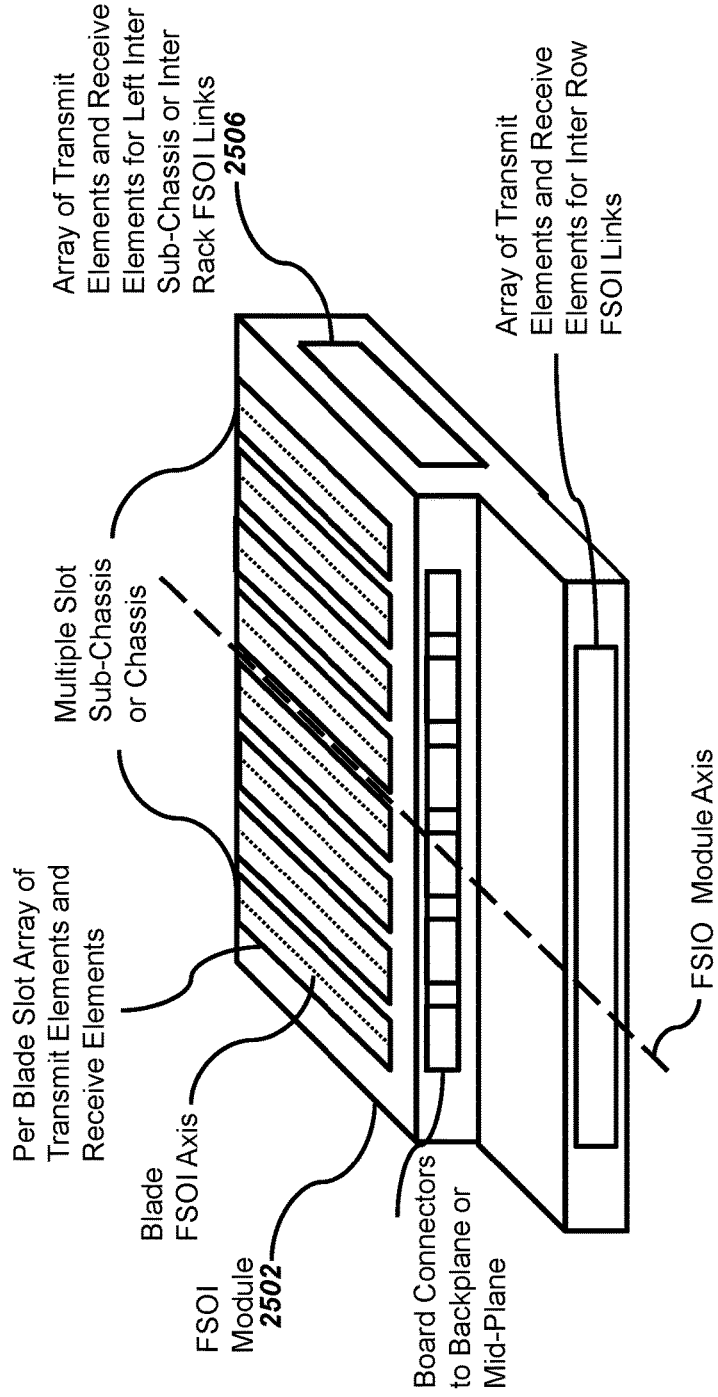
FIG. 25 illustrates the blade side, left and rear view of an FSOI module.
Figure 26:
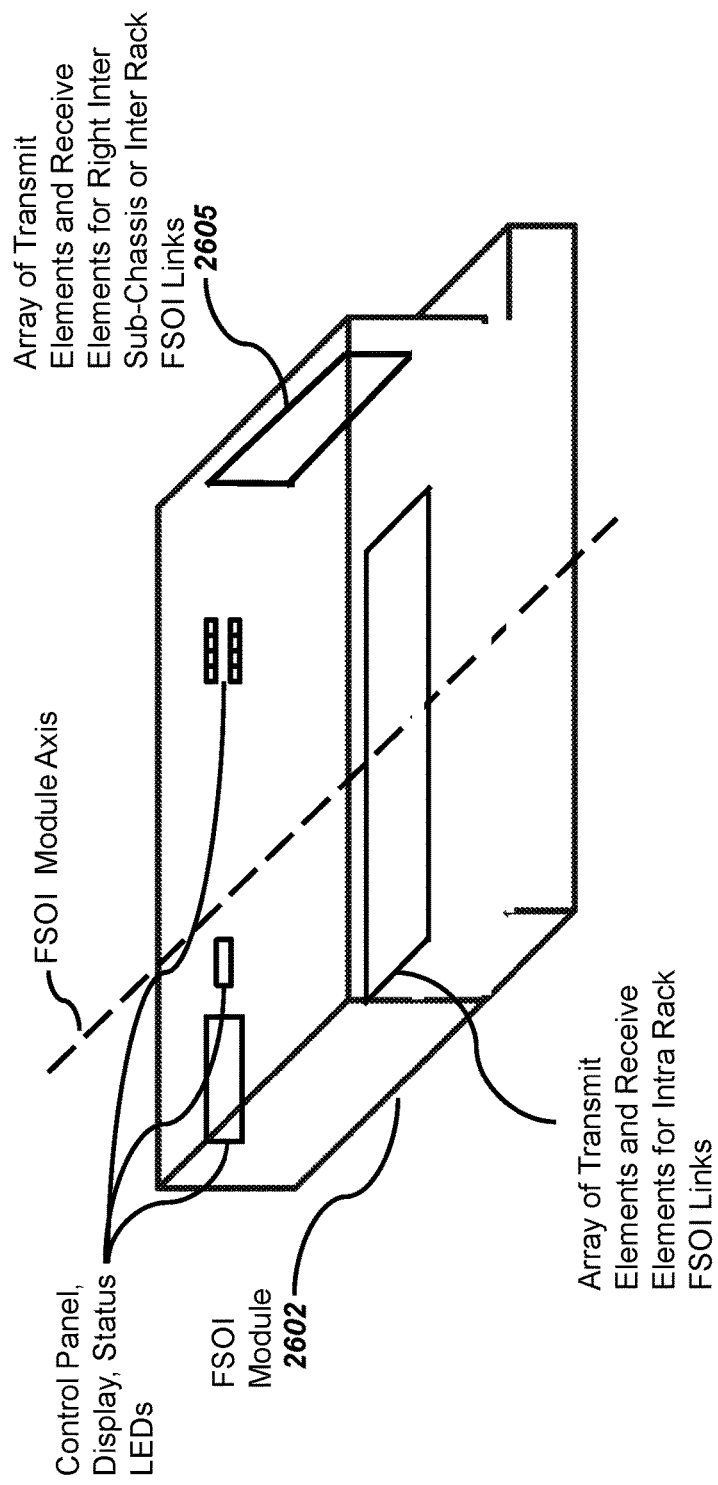
FIG. 26 illustrates the right, bottom and front view of an FSOI module.

FIG. 25 and FIG. 26 show one embodiment where the sides of the FSOI module 2502, 2602 are of reduced height as compared to FIG. 13 and FIG. 14. There is reduced surface area available for FSOI links 2506, 2605. There is increased room for blades 1710 as compared to FIG. 13 and FIG. 14.

Figure 27B:
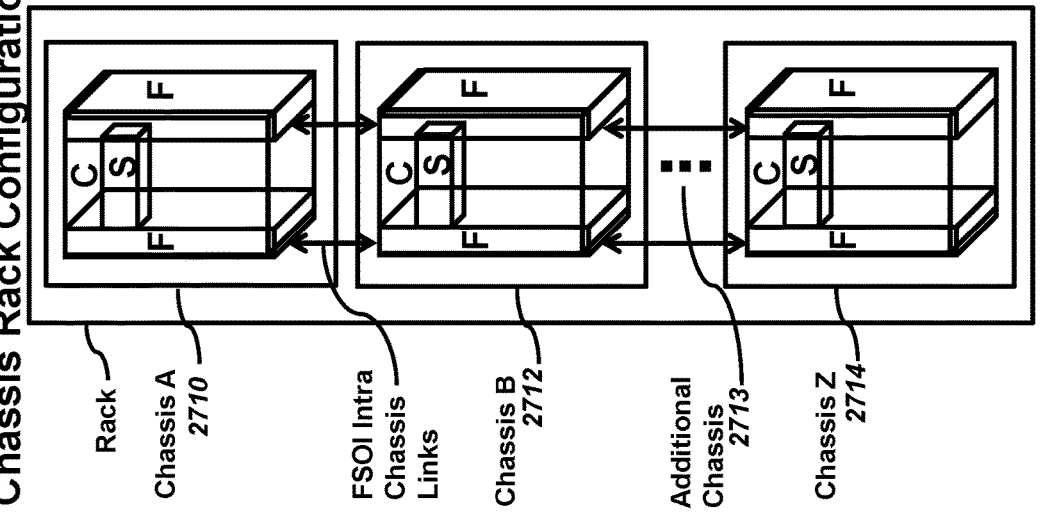
FIG. 27B illustrates the chassis rack configuration of computing modules and intra-chassis FSOI links.
Figure 27A:
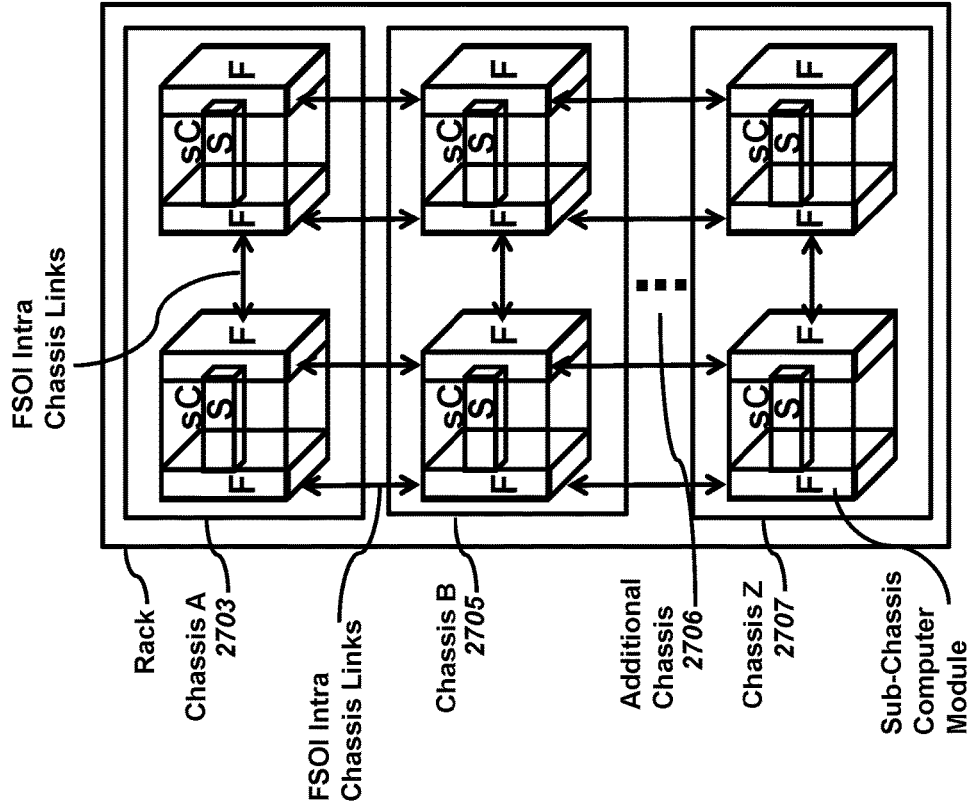
FIG. 27A illustrates the sub-chassis rack configuration of computing modules and intra-chassis FSOI links.

FIG. 27A shows one embodiment where the sub-chassis computer modules 2703, 2705, 2706, 2707 are organized in an orthogonal manner as compared to sub-chassis computer modules shown in FIG. 8A.

FIG. 27B shows one embodiment where the chassis computer modules 2710, 2712, 2713, 2714 are organized in an orthogonal manner as compared to chassis computer modules shown in FIG. 8B.

Figure 28:
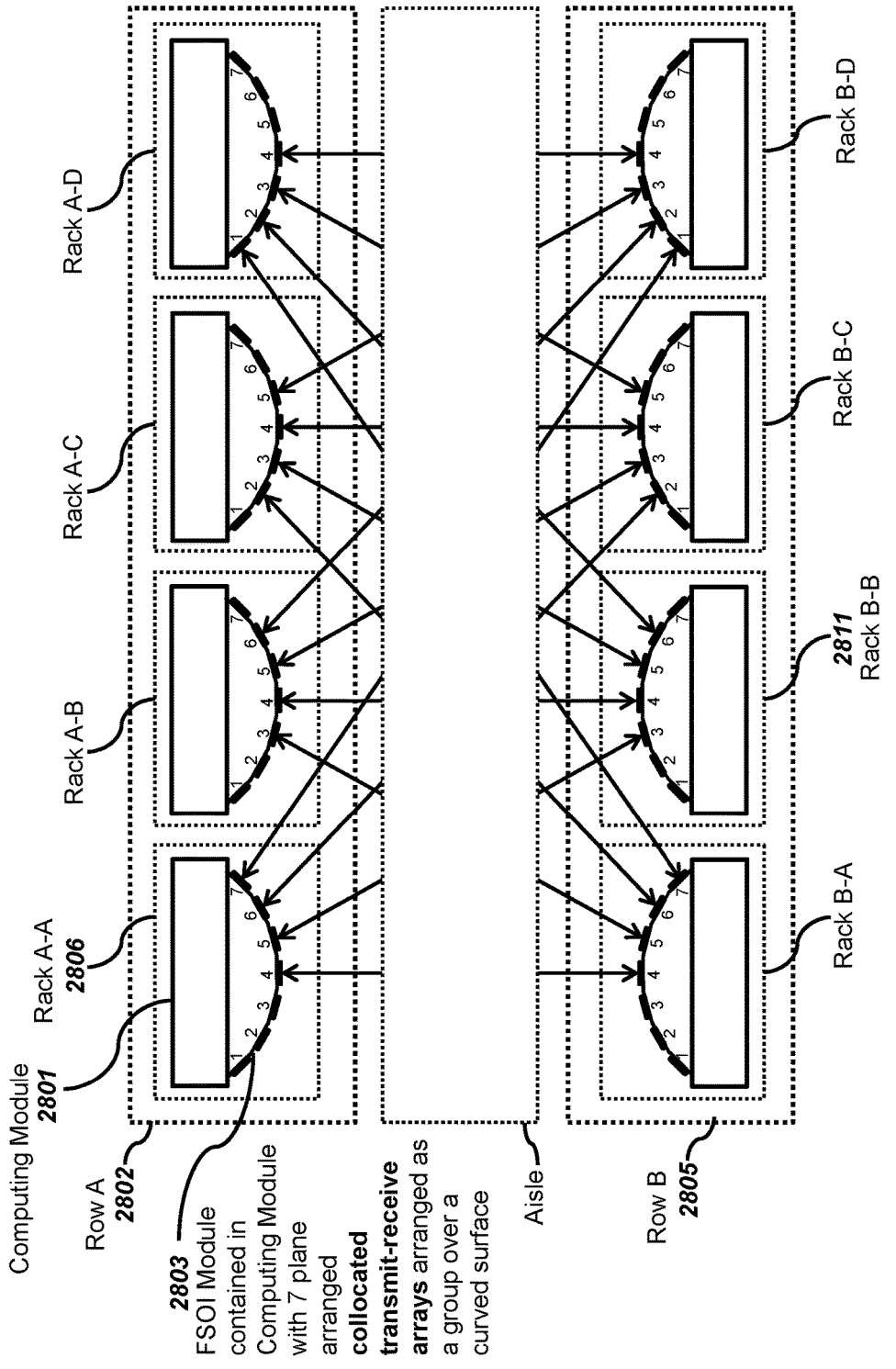
FIG. 28 illustrates two rows of racks separated by an aisle for a redundant rack column interconnect arrangement for a k-ary n-tree for k=2 and n=4. It also illustrates the arrangement of transmit and receive arrays over a curved surface

FIG. 28 shows one embodiment where there are two rows 2802, 2805 of 4 racks each. Each rack 2806 contains a column of computing modules 2801. Each computing module contains one or more FSOI Modules 1701, 1709. Each FSOI module 1701, 1709 provides positions for up to 7 plane arranged collocated transmit-receive arrays 2803 arranged as a group over a curved surface. The collocated transmit-receive array 2401 positions are numbered 1 through 7. In this example, all 7 collocated transmit-receive array positions are populated with collocated transmit-receive arrays 2401. The curved surface is such that each collocated transmit-receive array 2401 is nominally positioned and oriented to be orthogonal to the line-of-sight of the corresponding collocated transmit-receive array 2401 on a rack in the opposing row. For example, the collocated transmit-receive array 2401 labeled 5 contained in the FSOI module 1701 contained in Rack A-A 2806 is orthogonal to the line-of-sight of the collocated transmit-receive array 2401 labeled 3 contained in the FSOI module 1701 contained in Rack B-B 2811. Two orthogonal collocated transmit-receive arrays 1701 form a link array 2415. The geometrical construction forms a k-ary n-tree of FSOI links where k=2 and n=4. In this example, k is the number of rows which is 2 and n is the number of racks in a row which is 4.

What is claimed is:

1. An optical interconnect system comprising:
    a transmitter comprising an array of at least three light emitters each having a transmit power window; and
    a receiver comprising an array of receive elements each having an acceptance angle; and
    wherein the transmitter and the receiver are optically configured in relation to each other such that the acceptance angle of at least one receive element contains an entire at least a first transmit power window and contains at least a portion of at least a second transmit power window and contains fewer than all transmit power windows;
    wherein each receive element further comprises a prism, wherein the prism having an acceptance angle, an entrance window and an exit window, the exit window configured to pass light to a photo-detector, the entrance window configured to receive light from the transmitter, the receive elements further configured to form a two dimensional array.

2. An optical interconnect receiver comprising:
    a receiver comprising at least two receive elements; and
    wherein a first receive element of the at least two receive elements is configured to detect light from a first light emitter of at least three light emitters and to detect light from a second light emitter of the at least three light emitters and not to be illuminated by a third light emitter of the at least three light emitters and a second receive element of the at least two receive elements is configured not to be illuminated by the first light emitter and the first receive element is configured to be adjacent to the second receive element and the first light emitter is configured to be adjacent to the second light emitter and the second light emitter is configured to be adjacent to the third light emitter and at least one receive element of the at least two receive elements is configured to accept light from fewer than all of the at least three light emitters.

3. The optical interconnect system of claim 1, further comprising:
    A controller performing steps of:
    illuminating or extinguishing or illuminating and extinguishing groups of one or more light emitters of the at least three light emitters; and
    determining the received light power detected from the groups of one or more light emitters for each of the receive elements; and
    identifying zero or more of the groups of one or more light emitters contributing light power detected for each of the receive elements; and assigning zero or more of the light emitters from each group of one or more light emitters identified for each of the receive elements to each of the receive elements.

4. The optical interconnect link system of claim 3, further comprising:
the controller performing additional step of forming a uni-directional link for each receive element when there is at least one of the light emitters of the at least three light emitters assigned to a receive element, wherein the uni-directional link comprises the at least one of the light emitters assigned to the receive element.

5. The optical interconnect system of claim 1, wherein the transmitter further comprises at least three of fiber optic strands, wherein the fiber optic strands each having a first endpoint and a second endpoint, the first endpoints each configured to receive light from each of the at least three light emitters, the second endpoints forming a compact array, the compact array configured to form a two dimensional array, the compact array further configured to pass light to the receiver.

6. The optical interconnect system of claim 1, wherein the receiver further comprises a plurality of fiber optic strands, wherein the fiber optic strands each having a first endpoint and a second endpoint, the first endpoints each configured to pass light to each of the receive elements, the second endpoints forming a compact array, the compact array further configured to form a two dimensional array, the compact array further configured to receive light from the transmitter.

7. The optical interconnect receiver of claim 2, wherein the receiver further comprises at least two fiber optic cables, wherein the at least two fiber optic cables each having a first endpoint and a second endpoint, the first endpoints each configured to pass light to each of the at least two receive elements, the second endpoints forming a compact array, the compact array further configured to receive light from the at least three light emitters.

8. The optical interconnect system of claim 1, wherein the array of light emitters is further configured to conform to a curved surface.

9. The optical interconnect system of claim 1, wherein the array of receive elements is further configured to conform to a curved surface.

10. The optical interconnect receiver of claim 2, wherein the receive elements are further configured to conform to a curved surface.

11. The optical interconnect system of claim 1, the transmitter comprising an array of at least three transmit elements, each transmit element comprising a light emitter and a refractive compensation lens, each transmit element having a transmit power window.

12. The optical interconnect system of claim 11, wherein the transmit elements are configured to form a two dimensional array.

13. The optical interconnect system of claim 12, wherein the transmit elements are further configured to conform to a curved surface.

14. The optical interconnect system of claim 1, wherein each receive element further comprises conditioning optics.

15. The optical interconnect system of claim 1, wherein each receive element further comprises a refractive adaptation stage.

16. The optical interconnect system of claim 1, wherein the receive elements are further configured to form a two dimensional array.

17. The optical interconnect receiver of claim 2, wherein each receive element further comprises conditioning optics.

18. The optical interconnect receiver of claim 2, wherein each receive element further comprises a refractive stage.

19. The optical interconnect receiver of claim 2, wherein each receive element further comprises a plastic prism.

20. The optical interconnect receiver of claim 17, wherein the receive elements are further configured to form a one dimensional array.

21. The optical interconnect receiver of claim 2, wherein the receiver further comprises a plurality of fiber optic strands, each fiber optic strand having a first endpoint and a second endpoint, each first endpoint routed to each receive element, the second endpoints forming a compact array, the compact array configured to form a two dimensional array, the compact array optically configured to receive light from the at least three light emitters.

22. The optical interconnect receiver of claim 21, wherein the compact array conforms to a curved surface.

23. An optical interconnect transmitter comprising:
A transmitter comprising at least three light emitters, a first light emitter and a second light emitter of the at least three light emitters configured to illuminate a first receive element of a plurality of receive elements and the first light emitter configured not to illuminate a second receive element of the plurality of receive elements and the first light emitter configured to be adjacent to the second light emitter and a third light emitter of the at least three light emitters configured not to illuminate the first receive element of the plurality of receive elements and the third light emitter configured to be adjacent to the second light emitter;
wherein each transmit element further comprises a fiber optic cable, the fiber optic cable having a first endpoint and second endpoint, the first endpoint routed to the light emitter, the second endpoints of the fiber optic cable further configured to form a compact array, the compact array configured to pass light to the receiver.

24. The optical interconnect transmitter of claim 23, the transmitter comprising an array of at least three transmit elements, each transmit element comprising a light emitter and a refractive lens.

25. The optical interconnect transmitter of claim 24, wherein the transmit elements are further configured to form a two dimensional array.

26. The optical interconnect transmitter of claim 25, wherein the transmit elements are further configured to conform to a curved surface.

27. A method for an optical interconnect, comprising:
providing a transmitter comprising at least three light emitters and a receiver comprising a plurality of receive elements, wherein a first light emitter of the at least three light emitters configured to be adjacent to a second light emitter of the at least three light emitters and the second light emitter configured to be adjacent to a third light emitter of the at least three light emitters and a first receive element of the plurality of receive elements configured to be adjacent to a second receive element of the plurality of receive elements;
optically configuring the transmitter and the receiver for transmission and reception of light between;
illuminating or extinguishing or illuminating and extinguishing at least the first light emitter and the second light emitter and the third light emitter;
accepting light from the first light emitter and the second light emitter by the first receive element and accepting light from fewer than all of the at least three light emitters by a receive element of the plurality of receive elements; and not illuminating the first receive element by the third light emitter and not illuminating the second receive element by the first light emitter; and detecting light from at least the first light emitter and the second light emitter by the first receive element and detecting light from fewer than all of the at least three light emitters by the receive element.

28. The optical interconnect system of claim 1, wherein the light emitters are further configured to form a two dimensional array.

29. The optical interconnect transmitter of claim 23, wherein the light emitters are further configured to form a two dimensional array.

30. The optical interconnect transmitter of claim 24, wherein each transmit element further comprises a fiber optic cable or fiber optic strand.

\* \* \* \* \*